United States Patent
Gao et al.

(10) Patent No.: US 8,908,853 B2
(45) Date of Patent: Dec. 9, 2014

(54) METHOD AND DEVICE FOR DISPLAYING INFORMATION

(71) Applicant: Huawei Device Co., Ltd, Shenzhen (CN)

(72) Inventors: Wenmei Gao, Beijing (CN); Lei Wang, Beijing (CN); Huiping Zhang, Shenzhen (CN); Shunan Fan, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/872,834

(22) Filed: Apr. 29, 2013

(65) Prior Publication Data

US 2013/0235990 A1    Sep. 12, 2013

Related U.S. Application Data

(63) Continuation of application No. PCT/CN2011/080546, filed on Oct. 8, 2011.

(30) Foreign Application Priority Data

Oct. 29, 2010    (CN) .......................... 2010 1 0529057

(51) Int. Cl.
*H04M 3/00* (2006.01)
*H04M 1/56* (2006.01)
*H04M 11/00* (2006.01)
*H04M 1/57* (2006.01)
*H04N 21/431* (2011.01)
*H04N 21/4788* (2011.01)
*H04N 21/643* (2011.01)
*H04L 29/06* (2006.01)

(52) U.S. Cl.
CPC ............ *H04M 1/575* (2013.01); *H04N 21/431* (2013.01); *H04N 21/4788* (2013.01); *H04N 21/64322* (2013.01); *H04L 65/1069* (2013.01); *H04L 65/1096* (2013.01)
USPC ..................... 379/257; 379/142.01; 379/93.23

(58) Field of Classification Search
CPC ..................... H04M 1/72522; H04M 1/72583; H04N 21/258; H04N 21/25816
USPC .......... 379/142.01, 142.06, 207.16, 251, 252, 379/257, 93.23, 373.01
See application file for complete search history.

(56) References Cited

U.S. PATENT DOCUMENTS

2004/0032946 A1    2/2004  Koser et al.
2007/0030338 A1*   2/2007  Jiang et al. ................. 348/14.01
(Continued)

FOREIGN PATENT DOCUMENTS

CN    101188809 A    5/2008
CN    101330339 A    12/2008
(Continued)

OTHER PUBLICATIONS

International Search Report received in Application No. PCT/CN2011/080546, mailed Jan. 19, 2012, 8 pages.
(Continued)

*Primary Examiner* — Quoc D Tran
(74) *Attorney, Agent, or Firm* — Slater & Matsil, L.L.P.

(57) ABSTRACT

A method and device for displaying information operate during a call service based on an IPTV system. When a first user terminal calls a second user terminal, a person-to-person communication enabler in the IPTV system obtains identity information of media streams of a ring tone service corresponding to the first user terminal and/or the second user terminal. The obtained identity information of the media streams of the ring tone service is sent to an Internet Protocol Television service terminal corresponding to a first user and/or a second user, for playing corresponding media streams of the ring tone service.

21 Claims, 12 Drawing Sheets

(56) References Cited

U.S. PATENT DOCUMENTS

| | | | |
|---|---|---|---|
| 2007/0127655 A1* | 6/2007 | Jung et al. | 379/142.01 |
| 2007/0140299 A1 | 6/2007 | Hofmann et al. | |
| 2008/0307108 A1* | 12/2008 | Yan et al. | 709/231 |
| 2009/0150562 A1 | 6/2009 | Kim et al. | |
| 2010/0066801 A1* | 3/2010 | Zhu et al. | 348/14.01 |
| 2011/0038470 A1* | 2/2011 | Kent | 379/142.04 |

FOREIGN PATENT DOCUMENTS

| | | |
|---|---|---|
| CN | 101331732 A | 12/2008 |
| CN | 101472139 A | 7/2009 |
| CN | 101686449 A | 3/2010 |
| CN | 101764802 A | 6/2010 |
| EP | 2073493 A1 | 6/2009 |
| EP | 2479968 A1 | 7/2012 |
| WO | 2007124334 A2 | 11/2007 |

OTHER PUBLICATIONS

Chinese Office Action received in Application No. 201010529057.2 mailed Apr. 23, 2013, 10 pages.

"OIPF-T1-R2—Functional Architecture," V2.0, OPIF, Open IPTV Forum, E.V., Sep. 8, 2009, 234 pages.

Extended European Search Report, EP Application No. 11835590.8, mailed Nov. 29, 2013, 19 pages.

* cited by examiner

METHOD AND DEVICE FOR DISPLAYING INFORMATION

CROSS-REFERENCE TO RELATED APPLICATIONS

This application is a continuation of International Application No. PCT/CN2011/080546, filed on Oct. 8, 2011, which claims priority to Chinese Patent Application No. 201010529057.2, filed with the Chinese Patent Office on Oct. 29, 2010, both of which are incorporated herein by references in their entireties.

TECHNICAL FIELD

The present invention relates to the field of communication technologies, and in particular, to a method and device for displaying information.

BACKGROUND

Internet Protocol Television (IPTV) is defined as multimedia services such as television, video, text, graphics, and data delivered over networks managed to provide the required level of quality of service (QoS), security, interactivity, and reliability. The IPTV technology mainly uses home television sets, personal computers, mobile phones, and so on as display terminals to provide users with multiple interactive multimedia services including digital television programs through the Internet Protocol (IP). The users may receive the services through display terminals as required. The IPTV technology implements real-time interactions between users and media content providers to better meet the personalized requirements of users.

Some IPTV systems support call services. To be specific, some function entities in an IPTV system have a call service processing logical unit. When user A calls user B, a mobile terminal of user A sends a request (INVITE), and the request message reaches an IPTV service terminal corresponding to user B such as an open IPTV terminal function (OITF) and a user equipment (UE) after passing through an IPTV system function entity. In this way, the IPTV service terminal associated with user B can display a calling number or a user identity of A.

In an IPTV system that does not support call services, when user A uses a mobile terminal to originate a call to user B, the other network (Other Network) where the mobile terminal of user A is located sends an incoming call notification (Incoming Voice) to the IPTV system, and the IPTV system sends a notification message to the IPTV service terminal associated with user B such as an OITF and a UE to display a calling number or user identity of user A. In this case, the call services are implemented in other networks such as a fixed telephone network, a public land mobile network (PLMN), and an IP multimedia subsystem (IP Multimedia Subsystem, IMS) network.

When implementing the call services based on the IPTV system, the IPTV service terminal can only implement basic functions such as displaying the calling number and receiving short messages, which is simple and cannot meet the diversified requirements of users.

SUMMARY OF THE INVENTION

Embodiments of the present invention provide a method and device for displaying information, so as to provide a display function to meet the diversified requirements of users.

An embodiment of the present invention provides a method for displaying information based on Internet Protocol Television, including when a first user terminal calls a second user terminal, obtaining identity information of media streams of a ring tone service corresponding to the first user terminal and/or the second user terminal, and sending the identity information of the media streams of the ring tone service to an Internet Protocol Television service terminal corresponding to a first user and/or a second user, so that the Internet Protocol Television service terminal corresponding to the first user and/or the second user obtains and plays corresponding media streams of the ring tone service according to the identity information of the media streams of the ring tone service.

An embodiment of the present invention provides a method for displaying information, including receiving a prompt message, where the prompt message is used to prompt a user to select an Internet Protocol Television service terminal for playing media streams of a ring tone service, and receiving information about a redirecting terminal selected by the user for the media streams of the ring tone service among corresponding Internet Protocol Television service terminals, and sending the information about the redirecting terminal selected by the user to a person-to-person communication enabler, so that the person-to-person communication enabler sends identity information of corresponding media streams of the ring tone service to the selected redirecting terminal for playing the media streams of the ring tone service.

An embodiment of the present invention provides a method for displaying information, including receiving identity information of media streams of a ring tone service sent by a person-to-person communication enabler, and sending a request message to a play function entity to request the play function entity to deliver corresponding media streams of the ring tone service, where the media streams of the ring tone service are media streams of the ring tone service corresponding to a first user terminal and/or a second user terminal when the first user terminal calls the second user terminal, and receiving and playing the media streams of the ring tone service delivered by the play function entity.

An embodiment of the present invention provides a person-to-person communication enabler device, including a media identity obtaining unit, configured to obtain identity information of media streams of a ring tone service corresponding to a first user terminal and/or a second user terminal when the first user terminal calls the second user terminal, and a sending and playing unit, configured to send the identity information of the media streams of the ring tone service obtained by the media identity obtaining unit to an Internet Protocol Television service terminal corresponding to a first user and/or a second user, so that the Internet Protocol Television service terminal corresponding to the first user and/or the second user obtains and plays corresponding media streams of the ring tone service according to the identity information of the media streams of the ring tone service.

An embodiment of the present invention provides a user terminal, including a first prompt receiving unit, configured to receive a prompt message, where the prompt message is used to prompt a user to select an Internet Protocol Television service terminal for playing media streams of a ring tone service, and a first selecting and sending unit, configured to: after the first prompt receiving unit receives the prompt message, receive information about a redirecting terminal selected by the user for the media streams of the ring tone service among corresponding Internet Protocol Television service terminals, and send the information about the redirecting terminal selected by the user to a person-to-person communication enabler, so that the person-to-person communication enabler sends identity information of corresponding media streams of the ring tone service to the selected redirecting terminal for playing the media streams of the ring tone service.

An embodiment of the present invention further provides a service terminal, including an identity receiving unit, configured to receive identity information of media streams of a ring tone service sent by a person-to-person communication enabler, a first request sending unit, configured to: when the identity receiving unit receives the identity information of the media streams of the ring tone service, send a request message to a play function entity to request the play function entity to deliver corresponding media streams of the ring tone service, where the media streams of the ring tone service are media streams of the ring tone service corresponding to a first user terminal and/or a second user terminal when the first user terminal calls the second user terminal, and a playing unit, configured to receive and play the media streams of the ring tone service delivered by the play function entity.

The method provided in the embodiments of the present invention includes: during a call service based on an IPTV system, when a first user terminal calls a second user terminal, obtaining, by a person-to-person communication enabler in the IPTV system, identity information of media streams of a ring tone service corresponding to the first terminal and/or the second user terminal, and sending the obtained identity information of the media streams of the ring tone service to an Internet Protocol Television service terminal corresponding to a first user and/or a second user, for playing corresponding media streams of the ring tone service. In this way, during a call based on the IPTV system, the media streams of the ring back tone service associated with a calling party and a called party can be played on the IPTV service terminal, which enriches the content of the call and meets the diversified requirements of users.

BRIEF DESCRIPTION OF THE DRAWINGS

To illustrate the technical solutions in the embodiments of the present invention or in the prior art more clearly, the accompanying drawings required for describing the embodiments or the prior art are introduced briefly in the following. Apparently, the accompanying drawings in the following description merely show some embodiments of the present invention, and persons of ordinary skill in the art can derive other drawings from the accompanying drawings without creative efforts.

DETAILED DESCRIPTION OF ILLUSTRATIVE EMBODIMENTS

The technical solutions of the embodiments of the present invention are hereinafter described clearly and completely with reference to the accompanying drawings in the embodiments of the present invention. Evidently, the described embodiments are only some exemplary embodiments of the present invention, rather than all embodiments of the present invention. All other embodiments obtained by persons of ordinary skill in the art based on the embodiments of the present invention without creative efforts shall fall within the protection scope of the present invention.

Method Embodiment 1

Figure 1:
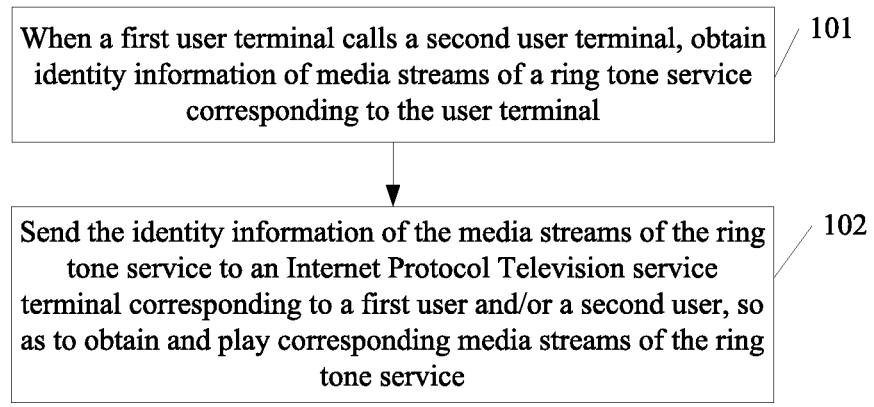
FIG. 1 is a flowchart of a method for displaying information based on Internet Protocol Television according to a first method embodiment of the present invention.

A method for displaying information based on Internet Protocol Television (hereinafter briefly referred to as IPTV) of this embodiment is a method executed by a person-to-person communication enabler in an IPTV network. A flowchart is shown in FIG. 1, and includes the following steps.

Step 101: When a first user terminal calls a second user terminal, obtain identity information of media streams of a ring tone service corresponding to the first user terminal and/or the second user terminal.

Figure 2:
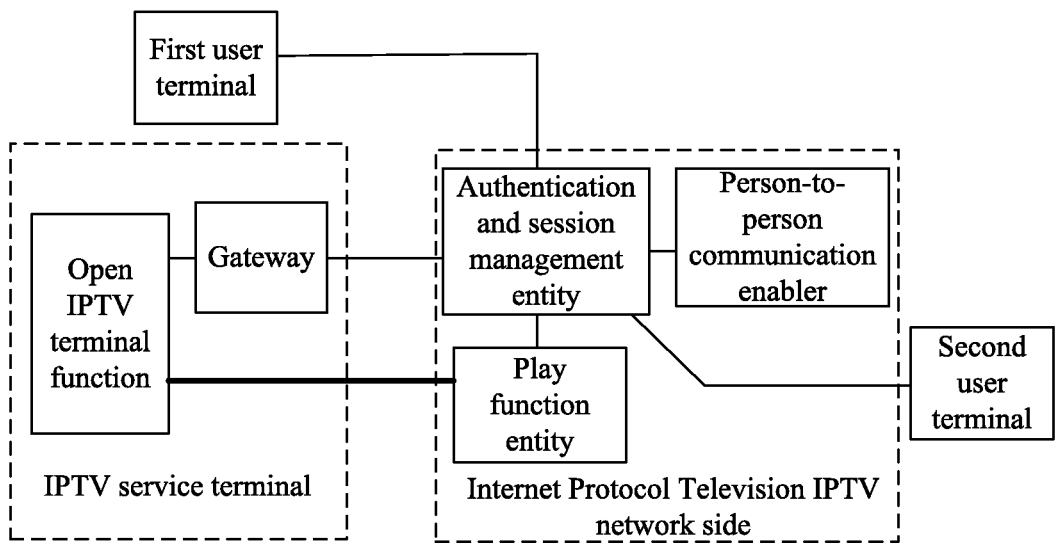
FIG. 2 is a structural diagram of an IPTV system that supports call services in a call process.
Figure 3:
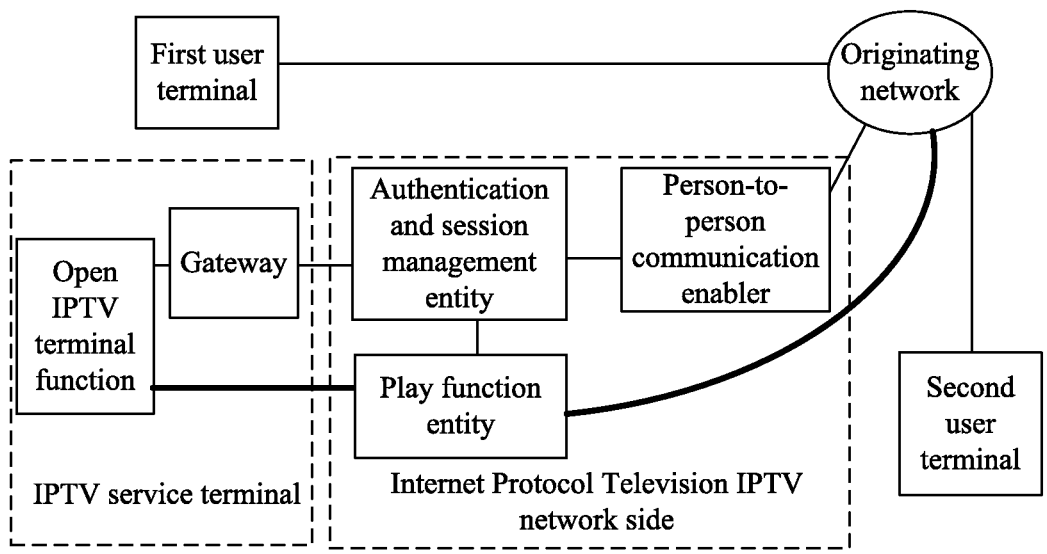
FIG. 3 is a structural diagram of an IPTV system that does not support call services in a call process.

It is understandable that the method of the embodiment of the present invention is applicable in a call process based on an IPTV system. FIG. 2 and FIG. 3 are respectively a structural diagram of an IPTV system that supports call services in a call process and a structural diagram of an IPTV system that does not support call services in a call process. The IPTV system mainly includes an IPTV service terminal and a network side. The IPTV service terminal includes an open IPTV terminal function (hereinafter briefly referred to as OITF), which has functions necessary for accessing IPTV services in a management network and a non-management network, such as a television set having the IPTV access function, or an IPTV set top box and a legacy television set, and a gateway, which may be an IP multimedia subsystem gateway (IMS Gateway, IG) and have functions necessary for allowing an OITF device to access the IPTV services in a management network, namely, an IP multimedia subsystem network (IMS), and may be understood as a function module in a home gateway.

The IPTV network side includes an authentication and session management entity (Authentication and Session Management, ASM), which is mainly configured to perform access authentication, session management, and accounting for a user terminal and ensure that a service request of the user terminal can be routed to a correct application server, a person-to-person communication enabler (Person-to-Person Communication Enablers, hereinafter briefly referred to as P2P Enabler), including interfaces for different communication services, such as presence (presence), chat (chat), messaging (messaging), and cell identity notification (caller ID notification), so that these communication services may be combined with the IPTV services, and a play function entity, which may be a cluster controller (Cluster Controller, CC) mainly responsible for managing playing of a group of content delivery functions (Content Delivery Function, CDF), or may be a CDF mainly responsible for processing, distribution, and playing of media streams under the control of a CC.

Herein, the user terminal is a terminal, namely, a user equipment (User Equipment, UE) which can originate a call, such as a mobile phone or a fixed phone. When a call is based on an IPTV system that supports call services, each device communicates according to the connections shown in FIG. 2. When a call is based on an IPTV system that does not support call services, each device communicates according to the connections shown in FIG. 3.

For an IPTV system that supports call services, when the first user terminal calls the second user terminal, the first user terminal sends a request (INVITE), and the request is transferred by the ASM in the IPTV system to the P2P Enabler. For an IPTV system that does not support call services, the first user terminal sends a request when originating a call in the current network where the first terminal is located to the second user terminal, and the current originating network sends the request to the P2P Enabler in the IPTV system.

It is understandable that the first and the second herein do not indicate any sequence, but indicate two different user terminals. The first user terminal and the second user terminal may also be understood as a calling terminal and a called terminal.

The media streams of the ring tone service herein may be any one or more of a ring back tone media stream, a ringing tone media stream, and a background tone media stream. The media stream content may include multimedia content such as audio, video, text, graphics, and electronic business cards.

The ring back tone media stream, namely, a multimedia ring back tone, is a multimedia ring back tone heard by a calling party before a called party goes off-hook to answer a call when the calling party calls the called party. At present, titles for the multimedia ring back tone vary from one standardization organization to another. In the 3GPP, the multimedia ring back tone is referred to as a customized alerting tone (Customized Alerting Tone, CAT), and in the ITU-T, the multimedia ring back tone is referred to as a CRBT (Customized Ring Back Tone), while in the OMA, the multimedia ring back tone is referred to as a CMRBT (Customized Multimedia Ring Back Tone).

The ringing tone media stream, namely, a multimedia ringing tone, is a multimedia ringing tone heard by the called party before the called party goes off-hook to answer the call when the calling party calls the called party. In the 3GPP, the multimedia ringing tone is referred to as a customized ringing signal (Customized Ringing Signal, CRS) CRS, and in the ITU-T, the multimedia ringing tone is referred to as a CRT (Customized Ringing Tone), while in the OMA, the multimedia ringing tone is referred to as a CMRT (Customized Multimedia Ringing Tone).

The background tone media stream, namely, a multimedia background tone, is a multimedia background tone that can be heard by both the calling party and the called party during a call between the calling party and the called party. In the 3GPP, the multimedia background tone is referred to as a customized background tone (Customized Background Tone, CBT).

Obtaining identity information of media streams of a ring tone service, for example, address information, uniform resource identifier (URL) of unicast type content, or multicast access address of multicast type content, may be implemented by using the following method: If the IPTV system supports call services, the P2P Enabler performs search locally according to identity information of the first user terminal and/or the second user terminal to obtain the identity information of the corresponding media streams of the ring tone service, while the locally stored identity information of media streams is stored during media stream negotiation with the user terminal in the call process; and if the IPTV system does not support call services, the P2P Enabler may actively request to obtain the identity information of the media streams of the ring tone service corresponding to the first user terminal and/or the second user terminal from the current originating network or receive the identity information of the media streams actively delivered by the current originating network.

It is understandable that the current originating network may add the identity information of the media streams of the ring tone service to a notification message, and actively send the message to the P2P Enabler; and after receiving the notification message, the P2P Enabler parses the notification message to obtain the service identity information of the media streams of the ring tone service.

Step 102: Send the identity information of the media streams of the ring tone service to an Internet Protocol Television service terminal corresponding to a first user and/or a second user, so that the Internet Protocol Television service terminal corresponding to the first user and/or the second user obtains and plays corresponding media streams of the ring tone service according to the identity information of the media streams of the ring tone service.

It is understandable that before the identity information of the media streams of the ring tone service is sent to the IPTV service terminal, it is necessary to first find the identity of the IPTV service terminal corresponding to the first user and/or second user. Specifically, during the search, the P2P Enabler may match user identity information of the first user and/or second user in the request received in the call process with a mapping relationship between locally stored user identity information and IPTV service terminals, and extract identity information of an IPTV service terminal matching the user identity information of the first user and/or second user and corresponding to the user identity information, so as to obtain an identity of the IPTV service terminal. The user identity information is information for uniquely identifying a user, while the service terminal identity information is information for uniquely identifying an IPTV service terminal.

It should be noted that if the information obtained in step 101 is identity information of a ring back tone media stream, the P2P Enabler sends the identity information of the ring back tone media stream to the IPTV service terminal corresponding to the first user, namely, the calling party; if the information is identity information of a ringing tone media stream, the P2P Enabler sends the identity information of the ringing tone media stream to the IPTV service terminal corresponding to the second user, namely, the called party; and if the information is identity information of a background tone media stream, the P2P Enabler sends the identity information of the background tone media stream to the IPTV service terminal corresponding to the first and second users, namely, the calling and called parties.

In addition, herein the IPTV service terminal corresponding to a user is a terminal device not including the user terminal, for example, a television set and a digital photo frame.

When the IPTV service terminal receives the identity information of the media streams of the ring tone service, if the identity information of the media streams of the ring tone service is a URL of unicast type content, the IPTV service terminal may use the URL as a destination address to initiate a Real-Time Streaming Protocol (RTSP) session setup and playing process, so as to receive the delivered RTSP unicast ring tone; and if the identity information of the media streams of the ring tone service is a multicast access address of multicast type content, the IPTV service terminal may access a corresponding multicast group according to the multicast access address, so as to receive the delivered multicast ring tone.

Evidently, in the embodiment of the present invention, the method for displaying information based on the Internet Protocol Television system includes: when the first user terminal calls the second user terminal, obtaining identity information of media streams of a ring tone service corresponding to the first user and/or the second user; and sending the identity information of the media streams of the ring tone service to an Internet Protocol Television service terminal corresponding to the first user and/or the second user, so that the Internet Protocol Television service terminal corresponding to the first user and/or the second user obtains and plays the corresponding media streams of the ring tone service according to the identity information of the media streams of the ring tone service. In this way, during a call based on the IPTV system, the media streams of the ring back tone service associated with the calling party and the called party can be played on the IPTV service terminal, which enriches the content of the call and meets the diversified requirements of users.

For example, user A uploads captured photos to a ring back tone server, uses the World Exposition theme song as the background music, and then writes some tour reflections. In this way, a multimedia ring back tone is formed by slides+ music+text. With the method of this embodiment, when user B calls user A, the multimedia ring back tone may be played on an IPTV service terminal corresponding to user B, for example, a digital photo frame and a television set, thereby enriching the call content.

Figure 4:
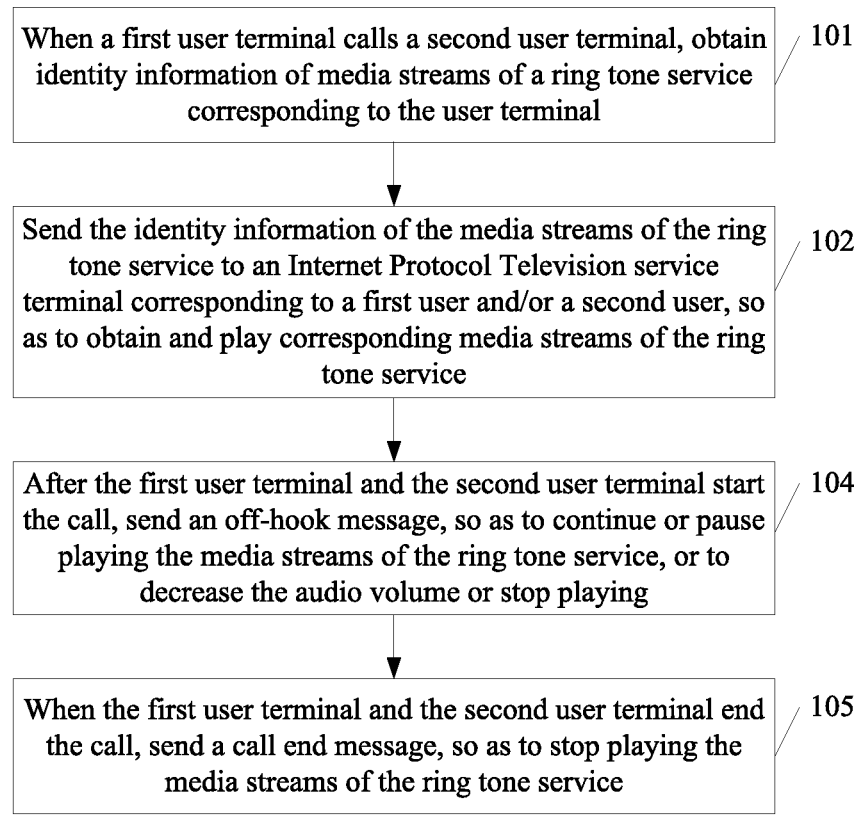
FIG. 4 is a flowchart of another method for displaying information based on Internet Protocol Television according to a method embodiment of the present invention.

Referring to FIG. 4, in a specific embodiment, after step 102 is executed, the following steps may be further included.

Step 104: After the first user terminal and the second user terminal start the call, send an off-hook message to the Internet Protocol Television service terminal corresponding to the first user and/or second user, so that the Internet Protocol Television service terminal corresponding to the first user and/or second user continues playing or pauses playing the media streams of the ring tone service, or decreases the audio volume in the media streams of the ring tone service or stops playing.

After the called second user terminal goes off-hook, an off-hook message is sent, where the off-hook message passes through the P2P Enabler; after receiving the off-hook message sent by the second user terminal, the P2P Enabler sends the off-hook message to the IPTV service terminal that is playing the media streams of the ring tone service; and after receiving the off-hook message, the IPTV service terminal may continue playing or pause playing, or decrease the audio volume in the media streams of the ring tone service or stop playing, which may avoid interference on the call between users.

Step 105: When the first user terminal and the second user terminal end the call, send a call end message to the Internet Protocol Television service terminal corresponding to the first user and/or second user, so that the Internet Protocol Television service terminal corresponding to the first user and/or second user stops playing the media streams of the ring tone service.

Likewise, when the first user terminal and the second user terminal end the call, that is, either of the user terminals goes on-hook, the user terminal that goes on-hook in advance sends a call end message, where the call end message passes through the P2P Enabler; after receiving the call end message, the P2P Enabler sends the call end message to the IPTV service terminal that is playing the media streams of the ring tone service; and after receiving the call end message, the IPTV service terminal may stop playing the media streams of the ring tone service and may also prompt the user to store the played media streams of the ring tone service into a local memory at the same time.

Figure 5:
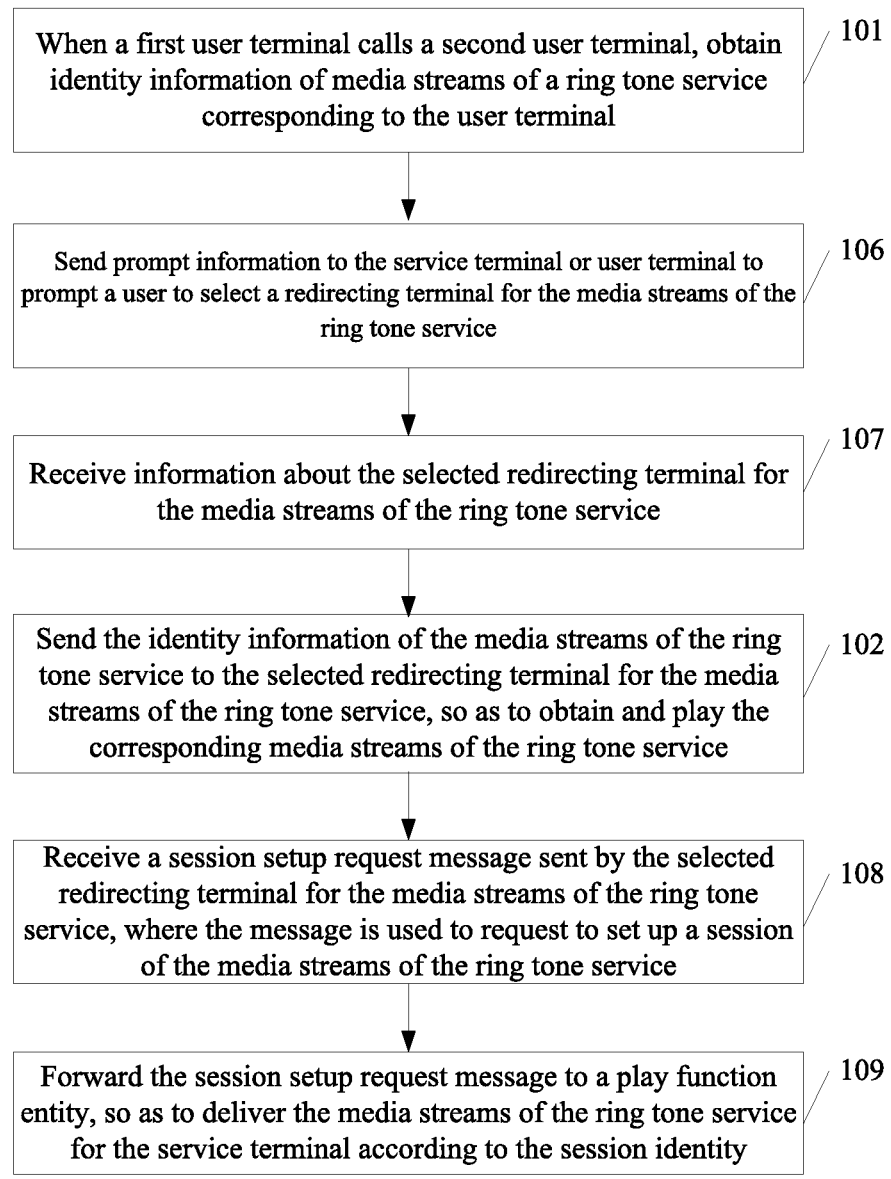
FIG. 5 is a flowchart of still another method for displaying information based on Internet Protocol Television according to a method embodiment of the present invention.

Referring to FIG. 5, in another specific embodiment, before the preceding step 102 is executed, steps 106 and 107 may be further executed.

Step 106: Send prompt information to the Internet Protocol Television service terminal corresponding to the first user and/or second user or to the first and/or second user terminal, where the prompt information is used to prompt a user to select an Internet Protocol Television service terminal corresponding to the user as a redirecting terminal for the media streams of the ring tone service, or to select one from multiple Internet Protocol Television service terminals corresponding to the user as the redirecting terminal for the media streams of the ring tone service.

Herein the IPTV service terminal corresponding to a user is a device not including the user terminal of the user, for example, a television set and a digital photo frame. To be specific, the P2P Enabler may send the prompt information to the first terminal and/or second user terminal, or may also send the prompt information to the IPTV service terminal such as a television set and a digital photo frame.

Step 107: After receiving information about the selected redirecting terminal for the media streams of the ring tone service, execute step 102, and send the identity information of the media streams of the ring tone service obtained in step 101 to the selected redirecting terminal for the media streams of the ring tone service.

Because there may be multiple IPTV service terminals corresponding to a user, for example, a television set, a personal computer, and a digital photo frame, to play the media streams on only the service terminal required by the user, the P2P Enabler may send the identity information of the IPTV service terminal to the service terminal or user terminal, and prompt the user to select one or more from the terminals. In this way, the user selects, through the service terminal or user terminal, the service terminal for playing the media streams, namely, the redirecting terminal for the media streams of the ring tone service, and sends the information about the redirecting terminal, such as a type identity, to the P2P Enabler. Therefore, when executing the preceding step 102, the P2P Enabler directly sends the identity information of the media streams of the ring tone service to the redirecting terminal.

In other specific embodiments, after steps 101, 106, 107, and 102 are executed, the redirecting terminal receives the identity information of the media streams of the ring tone service sent by the P2P Enabler, and afterward the following steps may be further executed:

Step 108: Receive a session setup request message sent by the selected redirecting terminal for the media streams of the ring tone service to request to set up a session of the media streams of the ring tone service.

Step 109: Forward the session setup request message to a play function entity, such as a cluster controller or a content delivery function, where the forwarded session setup request message carries a session identity of the media streams of the ring tone service currently delivered for the first user terminal and/or second user terminal, so that the play function entity delivers the media streams of the ring tone service to the Internet Protocol Television service terminal corresponding to the first user and/or second user according to the session identity.

After the redirecting terminal receives the identity information of the media streams of the ring tone service, the redirecting terminal sends the session setup request message to request to set up a session of the media streams of the ring tone service; after receiving the session setup request message, the P2P Enabler forwards the session setup request message to the play function entity, and adds the session identity to the message. It is understandable that the play function entity delivers corresponding ring tone media streams for the user terminal in the call process of the user terminal through a session. This is based on the prior art, and not described herein. The session identity herein is the identity of the session.

After receiving the forwarded session setup request message, the play function entity may find, according to the session identity, the media streams of the ring tone service delivered for the user terminal, and may also obtain a time offset from the start time of delivery for the user terminal to the current time, and deliver the content of the media streams of the ring tone service corresponding to the time offset to the IPTV service terminal, without restarting the playing.

It is understandable that the session setup request message sent by the redirecting terminal may include the type identity of the redirecting terminal, such as television set type, digital photo frame type, and personal computer type, to request the play function entity to deliver streaming media of the ring tone service suitable for a playing format of the redirecting terminal corresponding to the type identity to the redirecting terminal; in this way, the play function entity sends ring tone media streams suitable for the playing format of the redirecting terminal to the redirecting terminal according to the type identity; for example, when the type of the redirecting terminal is a digital photo frame, the play function entity delivers streaming media suitable for a playing format of the digital photo frame to the digital photo frame, where the playing format includes the playing pixel and size.

It should be noted that, in this embodiment, the communication between the P2P Enabler and the television set, personal computer, digital photo frame, and so on among the IPTV service terminals needs to pass through a gateway; and the communication between the P2P Enabler and the user terminal passes through an originating network or an ASM device in the IPTV system.

Method Embodiment 2

Figure 6A:
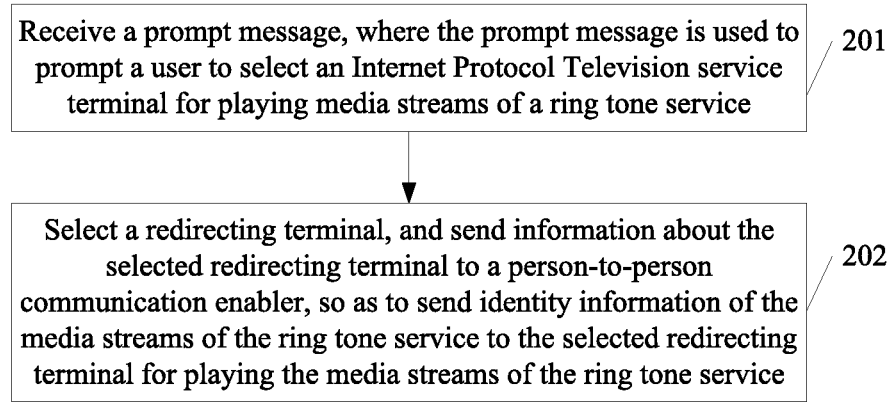
FIG. 6a is a flowchart of a method for displaying media stream information according to a second method embodiment of the present invention.

A method for displaying media streams in this embodiment may be a method executed by a first or second user terminal. A flowchart is shown in FIG. 6a, and includes the following steps.

Step 201: Receive a prompt message, where the prompt message is used to prompt a user to select an Internet Protocol Television service terminal for playing media streams of a ring tone service.

It is understandable that an P2P Enabler may send a prompt message to a user terminal; in this case, the user may select, through the user terminal, a service terminal for playing the media streams of the ring tone service; after the user terminal receives the prompt message, the user selects a terminal for playing the media streams of the ring tone service among corresponding Internet Protocol Television service terminals, namely, a redirecting terminal.

Step 202: Receive information about the redirecting terminal selected by the user for the media streams of the ring tone service among corresponding Internet Protocol Television service terminals, and send the information about the redirecting terminal selected by the user to a person-to-person communication enabler, so that the person-to-person communication enabler sends identity information of corresponding media streams of the ring tone service to the selected redirecting terminal for playing the media streams of the ring tone service.

Herein the IPTV service terminal corresponding to a user is a terminal including a television set, a personal computer, and a digital photo frame, and is a terminal that may display information provided by an operator in an IPTV system.

It is understandable that the received prompt message may include an identity of the IPTV service terminal corresponding to the user, and an identity of the redirecting terminal in the prompt message is sent to the P2P Enabler; and after receiving the information about the redirecting terminal, the P2P Enabler may proceed according to the steps after the preceding step 107, as shown in FIG. 5, which is not further described herein.

Evidently, the method for playing media streams in the embodiment of the present invention includes: receiving a prompt message, where the prompt message is used to prompt a user to select an Internet Protocol Television service terminal for playing media streams of a ring tone service; and receiving information about a redirecting terminal selected by the user for the media streams of the ring tone service among corresponding Internet Protocol Television service terminals, and sending the information about the redirecting terminal selected by the user to a person-to-person communication enabler, so that the person-to-person communication enabler sends the identity information of the corresponding media streams of the ring tone service to the selected redirecting terminal for playing the media streams of the ring tone service. With the method of this embodiment, the media streams of the ring tone service usually played on the user terminal may be redirected to the IPTV service terminal corresponding to the user, which meets the diversified requirements of users for playing media streams of the ring tone service.

Figure 6B:
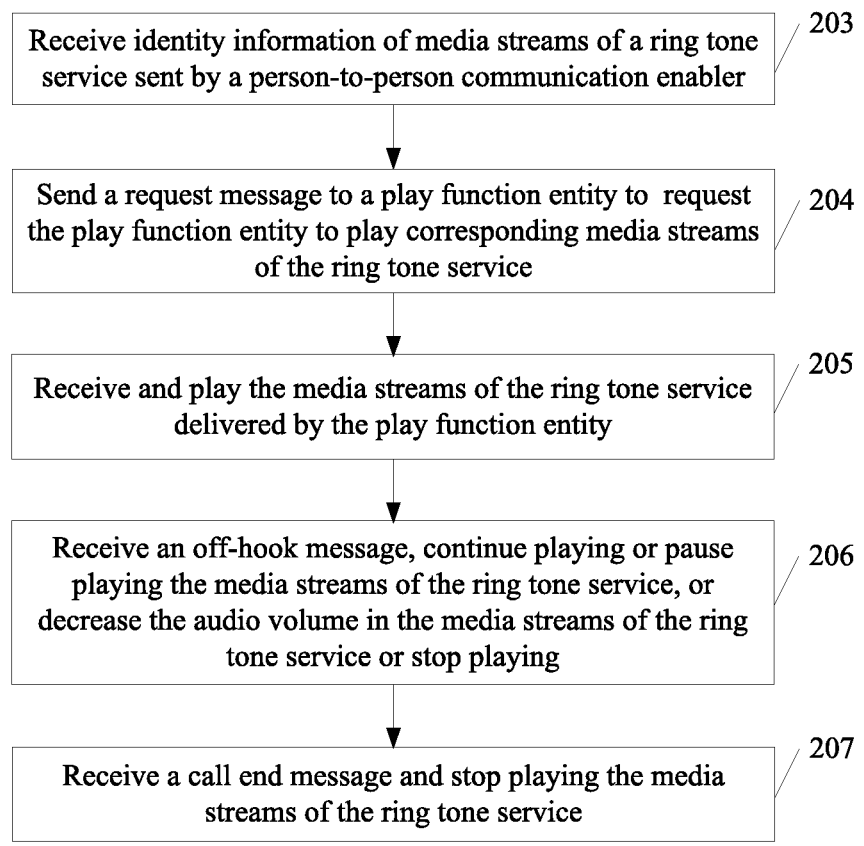
FIG. 6b is a flowchart of another method for displaying media stream information according to the second method embodiment of the present invention.

Information displaying of any IPTV service terminal may be implemented through the following steps, and a flowchart is shown in FIG. 6b, and includes the following steps.

Step 203: Receive identity information of media streams of a ring tone service sent by a person-to-person communication enabler.

Step 204: Send a request message to a play function entity to request the play function entity to play corresponding media streams of the ring tone service.

It is understandable that the method of this embodiment is as follows. When the first user calls the second user terminal, the P2P Enabler in the IPTV system sends the identity information of the media streams of the ring tone service corresponding to the first user terminal and/or second user terminal.

The service terminal may send a request message to the play function entity, and may add the identity information of the media streams of the ring tone service to the request message, such as address information; after receiving the request message, the play function entity finds determined media streams according to the identity information of the media streams of the ring tone service, and delivers the media streams to the service terminal; and the service terminal plays the received media streams.

The service terminal may also add a type identity of the service terminal to the request message. In this way, the play function entity delivers streaming media of the ring tone service suitable for a playing format of a corresponding service terminal to the service terminal according to the type identity of the service terminal.

Step 205: Receive and play the media streams of the ring tone service delivered by the play function entity.

In a specific embodiment, the service terminal may also execute the following steps.

Step 206: Receive an off-hook message sent by the person-to-person communication enabler, continue playing or pause playing the media streams of the ring tone service, or decrease the audio volume in the media streams of the ring tone service or stop playing.

After a called user goes off-hook, a called user terminal sends an off-hook message, where the off-hook message passes through the P2P Enabler; in this case, the P2P Enabler sends the off-hook message to the service terminal that is playing the media streams of the ring tone service; and after receiving the off-hook message, the service terminal performs corresponding processing.

Step 207: Receive a call end message sent by the person-to-person communication enabler, and stop playing the media streams of the ring tone service.

After either user goes on-hook, the user terminal sends a call end message, where the call end message passes through the P2P Enabler; in this case, the P2P Enabler sends the call end message to the service terminal that is playing the media streams of the ring tone service; and after receiving the call end message, the service terminal performs corresponding processing.

Figure 7:
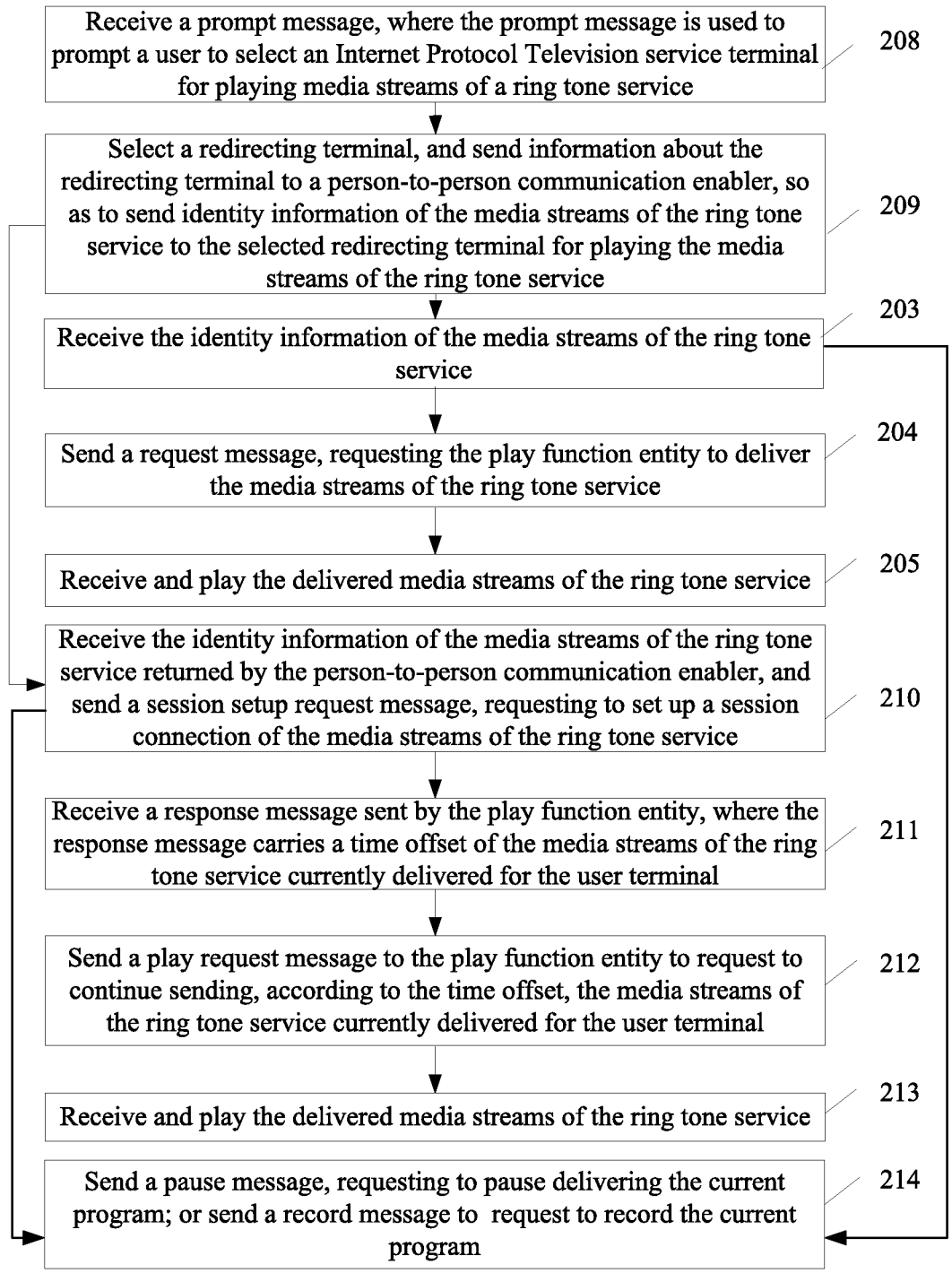
FIG. 7 is a flowchart of another method for displaying media stream information according to a method embodiment of the present invention.

Referring to FIG. 7, in other specific embodiments, the P2P Enabler may first send a prompt message to the service terminal, so that the user selects, through the service terminal, a service terminal on which the media streams of the ring tone service are played; then the P2P Enabler sends the identity information of the media streams of the ring tone service again, which is specifically implemented through the following steps.

Step 208: The service terminal receives a prompt message, where the prompt message is used to prompt a user to select an Internet Protocol Television service terminal for playing media streams of a ring tone service.

After receiving the prompt message, the user selects a terminal for playing the media streams of the ring tone service among corresponding Internet Protocol Television service terminals, namely, a redirecting terminal.

Step 209: The service terminal receives information about the redirecting terminal selected by the user for the media streams of the ring tone service among corresponding Internet Protocol Television service terminals, and sends the information about the redirecting terminal selected by the user to a person-to-person communication enabler, so that the person-to-person communication enabler sends identity information of corresponding media streams of the ring tone service to the selected redirecting terminal for playing the media streams of the ring tone service.

Herein the IPTV service terminal corresponding to a user is a terminal including a television set, a personal computer, and a digital photo frame, and is a terminal that may display information provided by an operator in an IPTV system.

It is understandable that the received prompt message may include the identity of the IPTV service terminal corresponding to the user, and that the identity of the redirecting terminal in the prompt message is sent to the P2P Enabler; and after receiving the information about the redirecting terminal, the P2P Enabler may proceed according to the steps after the preceding step 107, as shown in FIG. 5, which is not further described herein.

When the user selects the service terminal that receives the prompt message as a redirecting terminal, the service terminal may display the media streams of the ring tone service through steps 203 to 205; or the service terminal may execute the following steps.

Step 210: Receive the identity information of the media streams of the ring tone service returned by the person-to-person communication enabler, and send a session setup request message to request the play function entity to set up a session connection of the media streams of the ring tone service.

Step 211: Receive a response message sent by the play function entity, where the response message carries a time offset of the media streams of the ring tone service currently delivered for the user terminal.

It is understandable that the service terminal may send a request message to the P2P Enabler, and may add the identity information of the media streams of the ring tone service to the request message, such as address information; and when receiving the request message, the P2P Enabler may find, according to the identity information of the media streams of the ring tone service, a session identity of the media streams of the ring tone service currently delivered for the user terminal, and add the session identity to the request message and forward the request message to the play function entity.

After receiving the forwarded request message, the play function entity finds, according to the session identity, the corresponding media streams, and the time offset of the media streams of the ring tone service currently delivered for the user terminal, namely, a difference from the start time of delivering the media streams for the user terminal to the current time; and adds the time offset to a response message and returns the message to the service terminal.

Step 212: Send a play request message to the play function entity to request the play function entity to continue sending, according to the time offset, the media streams of the ring tone service currently delivered for the user terminal.

Step 213: Receive and play the delivered media streams of the ring tone service.

After receiving the response message, the service terminal sends a play request message; and the play function entity sends the media streams according to the time offset. In this way, the service terminal does not need to play the media streams from the beginning. For example, the time offset is t; in this case, the play function entity obtains the media stream content after the play time t, and starts to deliver the media streams from the content. In this way, the media streams played on the service terminal are not repeated.

It is understandable that, the service terminal may add the type identity of the selected redirecting terminal to the session setup request message sent in step 210 to request the play function entity to deliver streaming media of the ring tone service suitable for a playing format of the redirecting terminal corresponding to the type identity to the redirecting terminal. The play request message sent in step 212 may also carry the type identity of the selected redirecting terminal to request the play function entity to deliver streaming media of the ring tone service suitable for the playing format of the redirecting terminal corresponding to the type identity to the redirecting terminal.

It is understandable that after the identity information of the media streams of the ring tone service is received in step 203 and step 210, when the request message is sent to the play function entity in step 204 or step 212, step 214 may also be executed at the same time.

Step 214: Send a pause message to the play function entity, for example, a cluster controller or a content delivery function, to request the play function entity to pause delivering a current program; or send a record message to the play function entity to request the play function entity to record the current program.

If the IPTV service terminal is a television set, it is possible that a television program is being played. When the user terminal originates a call, the P2P Enabler delivers the identity information of the media streams of the ring tone service; and after the television set receives the identity information, the television set may interrupt the program being played. In order that the user does not miss the current program, the television set may send a record message to the play function entity to request to record the current program. In this way, the user may request the play function entity to play back the current program after watching the ring tone media streams through the television set.

In order that the current program does not affect the playing of the ring tone media streams, the television set may send a pause message to request the play function entity to pause delivering the current program.

It should be noted that the method executed by the P2P Enabler in this embodiment is similar to that in the first embodiment, and is not further described herein. In addition, when a call is based on an IPTV system that supports call services, each device communicates according to the connections shown in FIG. 2. When a call is based on an IPTV system that does not support call services, each device communicates according to the connections shown in FIG. 3.

Method Embodiment 3

Figure 8:
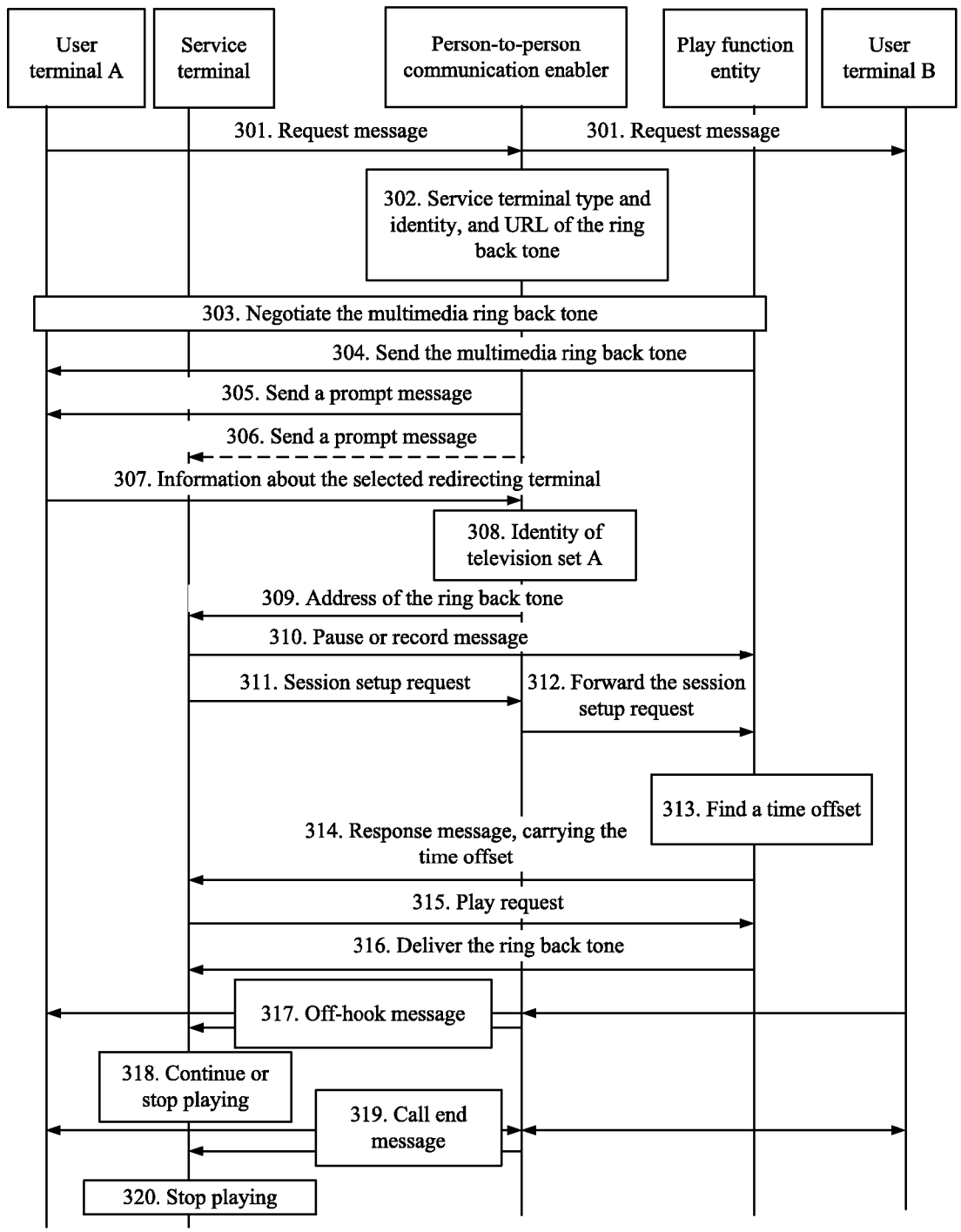
FIG. 8 is a flowchart of a method for displaying ring back tone information based on Internet Protocol Television supporting call services according to a method embodiment of the present invention.

A method for displaying information based on Internet Protocol Television is provided. An IPTV system provided in this embodiment supports call services, and media streams of a ring tone service are a specific multimedia ring back tone. A schematic structural diagram of the IPTV system is shown in FIG. 2. A flowchart of the method is shown in FIG. 8 (related steps of a gateway and an ASM device are not shown in the figure), and includes the following steps.

301: User A uses user terminal A to originate a call to user terminal B; and user terminal A sends a request message, which is hereinafter briefly referred to as an INVITE message, where the INVITE message passes through an ASM and a P2P Enabler to reach user terminal B.

302: When the P2P Enabler receives the INVITE message, the P2P Enabler finds, according to user identity information of user A, types and terminal identities of all IPTV service terminals (referred to as service terminals in this embodiment) corresponding to user A; and according to the user identity information, the P2P Enabler obtains an address identity of a corresponding multimedia ring back tone, namely, a uniform resource locator of a Real-Time Streaming Protocol (RTSP URL).

Herein a service terminal type is an attribute of the service terminal, for example, a television set type or a digital photo frame type; a terminal identity of the service terminal may uniquely identify the service terminal, and specifically may be a globally routable user agent uniform resource identifier (Global Routable User agent URI, GRUU), or may also be an instance identity (instance ID), and so on.

It is understandable that the user may set a service terminal type corresponding to the user in the P2P Enabler in advance; if the service terminal type is not set, the P2P Enabler considers that the service terminal type is a television set by default.

303: With the participation of the P2P Enabler, user terminal A and a play function entity such as CC&CDF negotiate the multimedia ring back tone.

304: After completion of the negotiation about the multimedia ring back tone, the CC&CDF send the multimedia ring back tone to user terminal A.

305: The P2P Enabler sends a prompt message to user terminal A.

The prompt message in this embodiment may be a signaling (INFO) message, used to prompt the user to select, by pressing keys, a redirecting terminal for playing the multimedia ring back tone, where the INFO message may carry text prompt information, for example, "You can transfer the ring back tone to any service terminal for watching: Press the key 1 to transfer to a television set, press the key 2 to transfer to a personal computer, and press the key 3 to transfer to a digital photo frame."

306: The P2P Enabler may also send same prompt information to the service terminal at the same time; in this case, the prompt information is transferred to a gateway through a communication message (MESSAGE), and then is notified by the gateway to the service terminal, where the notification message may be a Hypertext Transfer Protocol success response message (HTTP 200 OK) or a universal plug-and-play (Universal Plug-n-Play, UPnP) notification.

307: User A presses keys on user terminal A to determine to transfer the ring back tone media streams to television set A; and user terminal A sends an INFO message carrying a dual tone multi frequency (Dual Tone Multi Frequency, DTMF) signal to the P2P Enabler, where the INFO message passes through the ASM and reaches the P2P Enabler, and the DTMF signal indicates the type information of the redirecting terminal selected by user A, namely, information about television set A.

308: The P2P Enabler selects a corresponding terminal identity, namely, an identity of television set A according to the type information of the redirecting terminal fed back in the INFO message, namely, the information about television set A.

309: The P2P Enabler sends the URL of the ring back tone to television set A through a MESSAGE message according to the identity of the selected television set A; and in addition, the P2P Enabler may add a ring back tone service flag to the MESSAGE message, for example, a 3GPP feature tag (feature tag), so that the IPTV service terminal can know that the URL is used to play the ring back tone. After reaching the gateway, the MESSAGE message is converted into a notification message and sent to television set A.

It is understandable that the P2P Enabler may send the URL of the ring back tone in a push (Push) mode. Specifically, when the P2P Enabler sends a MESSAGE message to television set A, the value of an accept-contact (accept-contact) header field in the MESSAGE message is "+g.oma.sip-push", and the MESSAGE message carries the URL of the ring back tone.

Herein television set A is not shown separately in the figure, and is one type of service terminals in the figure.

310: After receiving the URL of the ring back tone, television set A may send a Real-Time Streaming Protocol pause message (RTSP PAUSE) or a Real-Time Streaming Protocol record message (RTSP RECORD) to the play function entity, so as to pause a current program or record the current program.

311: Television set A sends a Hypertext Transfer Protocol (HTTP) session setup request message to request to set up a ring back tone session, where the HTTP request carries the URL of the ring back tone, and in addition, may also carry an IPTV service terminal type, for example, a television set (TV) type, a mobile terminal type, a PC type, and other digital consumer terminal types, and herein the carried terminal type is the TV type; the request message is converted into a signaling control protocol (SIP) request message through a gateway, and sent through the ASM to the P2P Enabler.

312: The P2P Enabler adds an RTSP session identity (Session-ID) of the ring back tone media stream currently delivered by the play function entity for user terminal A to a SIP INVITE message, and then forwards the INVITE message to the play function entity.

It is understandable that the session identity herein is stored in the P2P Enabler in the process of negotiating the ring back tone media stream, and may be found according to the user identity information of user A.

313: The play function entity finds, according to the session identity in the INVITE message, the multimedia ring back tone delivered for user terminal A, and obtains a currently played time offset, and in this case, may stop playing for user terminal A. In addition, the play function entity may select a format suitable for TV playing content according to the "TV type" carried in the INVITE message, for example, ring back tone content in a high definition format, and send the selected ring back tone content to television set A.

314: The play function entity returns a 200 OK response message, where the response message carries a time offset through a range (Range) header field and finally reaches television set A.

315: Television set A sends a play request message (RTSP PLAY) to the play function entity, where the message carries the time offset and requests to start delivering the ring back tone.

316: The play function entity delivers the multimedia ring back tone for television set A.

317: Called user B goes off-hook; user terminal B sends a 200 OK off-hook message to user terminal A, where the message passes through the P2P Enabler and ASM, and reaches user terminal A.

In this process, when receiving the 200 OK off-hook message, the P2P Enabler sends an off-hook message to television set A through a MESSAGE message, where the off-hook message is converted into a notification message through the gateway and then sent to television set A.

318: After receiving the off-hook message, television set A may continue playing or stop playing the ring back tone. By default, the playing of the ring back tone is continued.

319: When the call ends, either user goes on-hook, and the user terminal of the user sends a call end message; and when the P2P Enabler receives the call end message, the P2P Enabler sends the call end message to television set A through a MESSAGE message, where the message is converted into a notification message through the gateway and sent to television set A.

320: When receiving the call end message, television set A needs to stop playing the ring back tone, and needs to tear down an RTSP session with the play function entity at the same time, that is, television set A sends an announcement (HTTP POST) message carrying a bye message (SIP BYE), the gateway converts the message into a bye message (SIP BYE), and the P2P Enabler forwards the SIP BYE message to the play function entity. The play function entity stops sending the ring back tone, and releases corresponding resources.

In this embodiment, the preceding steps 302 to 308 may be omitted, so that the play capability entity directly sends the media streams of the ring tone service to the IPTV service terminal corresponding to the user without requiring the user to participate.

Method Embodiment 4

Figure 9:
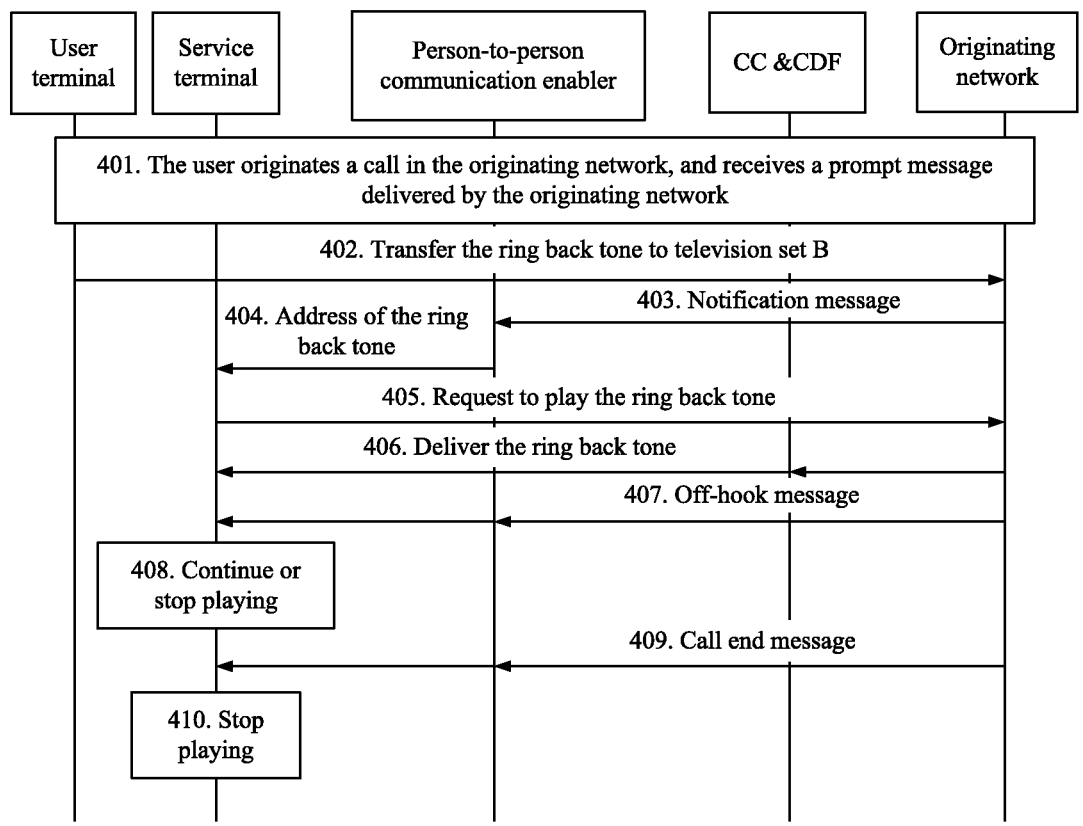
FIG. 9 is a flowchart of a method for displaying ring back tone information based on Internet Protocol Television not supporting call services according to a method embodiment of the present invention.

A method for displaying information based on Internet Protocol Television is provided. An IPTV system provided in this embodiment does not support call services, and media streams of a ring tone service are a specific multimedia ring back tone. A schematic structural diagram of the IPTV system is shown in FIG. 3. A flowchart of the method is shown in FIG. 9 (related steps of a gateway and an ASM device are not shown in the figure), and includes the following steps.

401: A user terminal of user A originates a call in an originating network (an IMS network in this embodiment), and receives the multimedia ring back tone delivered by the IMS network; and a play function entity in the IMS network sends a prompt message to the user terminal while delivering the ring back tone to the user terminal, to prompt that the user may press keys to transfer the ring back tone to an IPTV service terminal (referred to as a service terminal in this embodiment).

402: The user presses keys on the user terminal; and the user terminal sends an INFO message to the IMS network to request to transfer the ring back tone to television set B (the service terminal in this embodiment); and the IMS network may return a corresponding response message.

403: The IMS network sends a notification message to a P2P Enabler in an IPTV network to notify the P2P enabler of transferring the ring back tone to television set B, where the notification message carries an RTSP URL of the ring back tone and further carries user identity information.

Herein television set B is not shown separately in the figure, and is one type of service terminals in the figure.

404: After receiving the notification message from the IMS network, the P2P Enabler finds an identity of television set B in a corresponding IPTV service terminal according to the carried user identity information, and sends a MESSAGE message to television set B, where the message carries address information of the ring back tone, namely, a URL, the MESSAGE passes through the ASM and reaches the gateway, and the gateway converts the MESSAGE into a notification message and then sends it to television set B.

405: Television set B sends a request to the play function entity (CC&CDF in this embodiment) in the IMS network according to the obtained URL of the ring back tone, to request the play function entity to deliver the ring back tone.

406: The play function entity in the IMS network delivers a corresponding ring back tone to the CC&CDF, where the ring back tone reaches television set B; and television set B starts to play the ring back tone.

407: When the called user goes off-hook, the IMS network notifies the P2P Enabler of an off-hook message.

After receiving the off-hook message from the IMS network, the P2P Enabler sends a MESSAGE message to television set B, where the message carries off-hook information. The MESSAGE passes through the ASM and reaches the gateway, and the gateway converts the MESSAGE into a notification message and sends it to television set B.

408: After receiving the forwarded off-hook message, television set B may stop or continue playing the ring back tone. By default, the playing is continued.

409: When either user (calling party or called party) ends the call, the IMS network sends a call end message to the P2P Enabler.

After receiving the call end message from the IMS network, the P2P Enabler sends a MESSAGE message to television set B, where the message carries call end information; the MESSAGE passes through the ASM and reaches the gateway, and the gateway converts the MESSAGE into a notification message and then sends it to television set B.

410: After receiving the forwarded call end message, television set B stops playing the ring back tone and ends the call, and executes a TEARDOWN procedure to tear down an RTSP session.

In the preceding step 401 of this embodiment, the prompt message may be not sent to the user terminal of the calling user, but the notification message is sent to the P2P Enabler directly through step 403; and the address of the ring back tone is sent to the IPTV service terminal corresponding to the calling user; while step 402 may be omitted, so that the play function entity directly delivers the media streams of the ring tone service to the IPTV service terminal corresponding to the user without requiring the user to participate.

Method Embodiment 5

Figure 10:
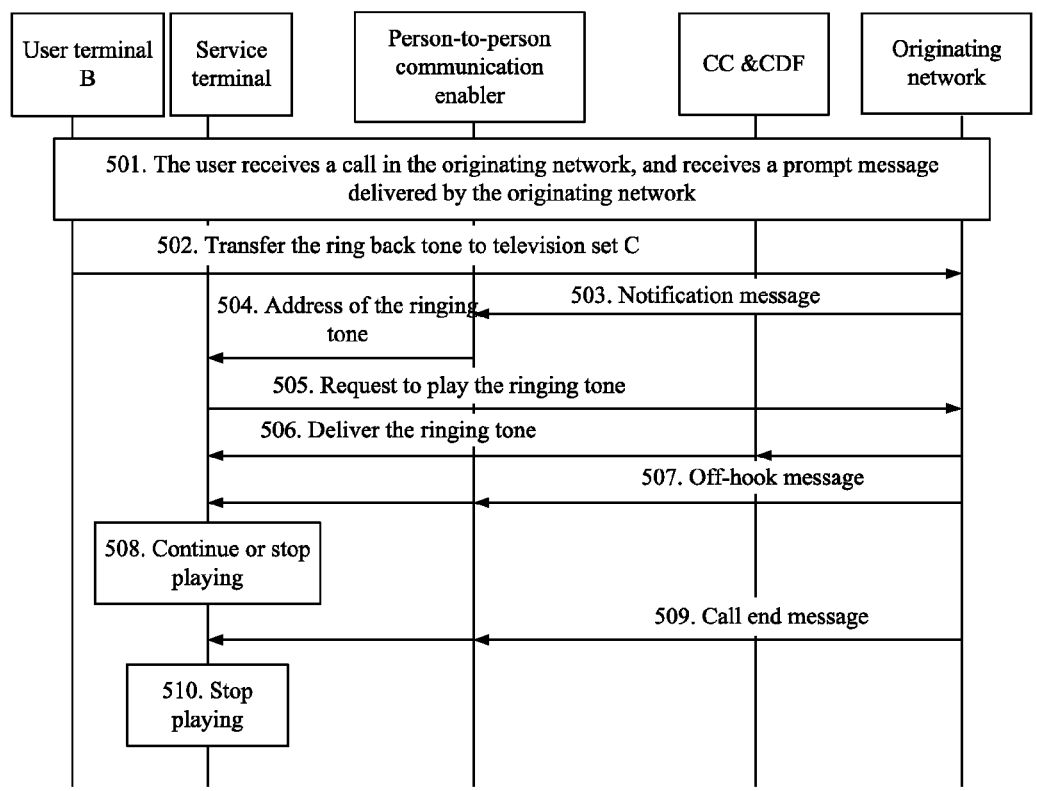
FIG. 10 is a flowchart of a method for displaying ringing tone information based on Internet Protocol Television not supporting call services according to a method embodiment of the present invention.

A method for displaying information based on Internet Protocol Television is provided. An IPTV system provided in this embodiment does not support call services, and media streams of a ring tone service are a specific multimedia ringing tone. A schematic structural diagram of the IPTV system is shown in FIG. 3. A flowchart of the method is shown in FIG. 10 (related steps of a gateway and an ASM device are not shown in the figure), and includes the following steps.

501: A user terminal of user A originates a call in an IMS network, namely, a originating network; called user terminal B receives the multimedia ringing tone delivered by the IMS network; and a play function entity in the IMS network sends a prompt message to a user terminal of user B while delivering a ringing tone to the user terminal, to prompt that the user may press keys to transfer the ring back tone to an IPTV service terminal (referred to as a service terminal in this embodiment).

502: User B presses keys on the user terminal, and the user terminal sends an INFO message to the IMS network to request to transfer the ringing tone to television set C (the service terminal in this embodiment); and the IMS network may return a corresponding response message.

503: The IMS network sends a notification message to a P2P Enabler in an IPTV network to notify the P2P Enabler of transferring the ringing tone to television set C, where the notification message carries an RTSP URL of the ringing tone and further carries user identity information of user B.

Herein television set C is not shown separately in the figure, and is one type of service terminals in the figure.

504: After receiving the notification message from the IMS network, the P2P Enabler finds an identity of television set C in a corresponding IPTV service terminal according to the carried user identity information, and sends a MESSAGE message to television set C, where the message carries address information of the ringing tone, namely, a URL, and the MESSAGE passes through the ASM and reaches the gateway; and the gateway converts the MESSAGE into a notification message and then sends it to television set C.

505: Television set C sends a request to the play function entity in the IMS network according to the obtained URL of the ringing tone, to request the play function entity to deliver the ringing tone.

506: The play function entity in the IMS network delivers a corresponding ringing tone to CC&CDF, where the ringing tone reaches television set C; and television set C starts to play the ringing tone.

507: When the called user B goes off-hook, the IMS network notifies the P2P Enabler of an off-hook message.

After receiving the off-hook message from the IMS network, the P2P Enabler sends a MESSAGE message to television set C, where the message carries off-hook information. The MESSAGE passes through the ASM and reaches the gateway, and the gateway converts the MESSAGE into a notification message and sends it to television set C.

508: After receiving the forwarded off-hook message, television set C may stop or continue playing the ringing tone. By default, the playing is continued.

509: When either user (calling party or called party) ends the call, the IMS network sends a call end message to the P2P Enabler.

After receiving the call end message from the IMS network, the P2P Enabler sends a MESSAGE message to television set C, where the message carries call end information; the MESSAGE passes through the ASM and reaches the gateway, and the gateway converts the MESSAGE into a notification message and then sends it to television set C.

510: After receiving the forwarded call end message, television set C stops playing the ringing tone and ends the call, and executes a TEARDOWN procedure to tear down an RTSP session.

Method Embodiment 6

Figure 11:
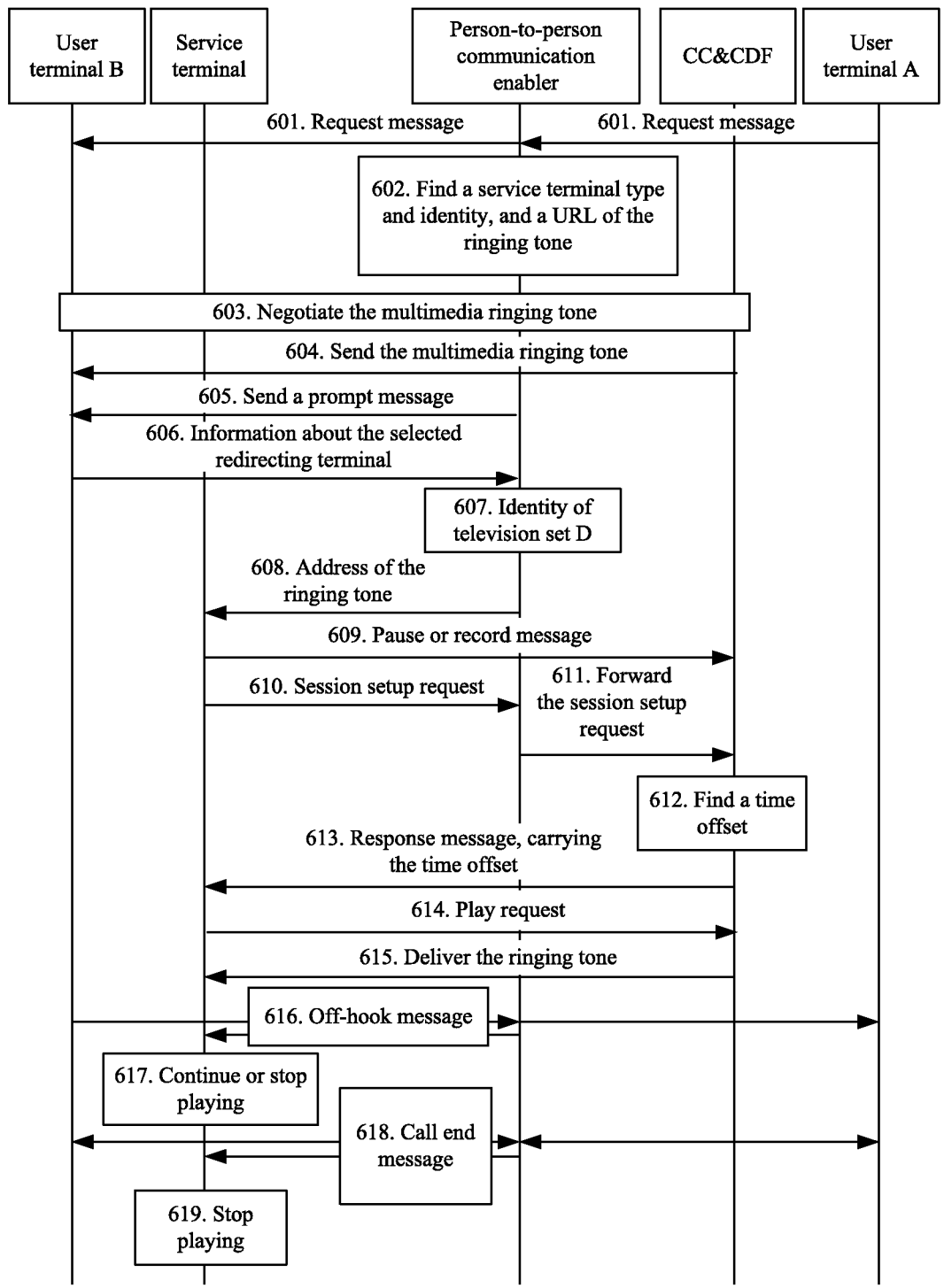
FIG. 11 is a flowchart of a method for displaying ringing tone information based on Internet Protocol Television supporting call services according to a method embodiment of the present invention.

A method for displaying information based on Internet Protocol Television is provided. An IPTV system provided in this embodiment supports call services, and media streams of a ring tone service are a specific multimedia ringing tone. A schematic structural diagram of the IPTV system is shown in FIG. 3. A flowchart of the method is shown in FIG. 11 (related steps of a gateway and an ASM device are not shown in the figure), and includes the following steps.

601: User A uses user terminal A to originate a call to user terminal B; and user terminal A sends an INVITE message, where the INVITE message passes through an ASM and a P2P Enabler to reach user terminal B.

602: When receiving the INVITE message, the P2P Enabler finds types and terminal identities of all IPTV service terminals corresponding to user B according to user identity information of user B.

603: With the participation of the P2P Enabler, user terminal B and CC&CDF negotiate the multimedia ringing tone. In the process of negotiating the multimedia ringing tone, the P2P Enabler obtains an address identity RTSP URL of a corresponding multimedia ringing tone according to the identity information of user B.

604: After completion of the negotiation about the multimedia ringing tone, the CC&CDF send the multimedia ringing tone to user terminal B.

605: The P2P Enabler sends a prompt message to user terminal B to prompt the user to select, by pressing keys, a redirecting terminal for playing the multimedia ringing tone, where an INFO message carries text prompt information, for example, "You can transfer the ringing tone to any service terminal for watching: Press the key 1 to transfer to a television set, press the key 2 to transfer to a personal computer, and press the key 3 to transfer to a digital photo frame".

606: User B presses keys on user terminal B to determine to transfer the ringing tone media stream to television set D (the service terminal in this embodiment), and user terminal B sends an INFO message carrying a DTMF signal to the P2P Enabler, where the INFO message passes through the ASM and reaches the P2P Enabler. The DTMF signal indicates type information of the redirecting terminal selected by user B, namely, information about television set D.

607: The P2P Enabler selects a corresponding terminal identity, namely, an identity of television set D, according to the type information of the redirecting terminal fed back in the INFO message, namely, the information about television set D.

608: The P2P Enabler sends a URL of a ringing tone to television set D through a MESSAGE message according to the identity of the selected television set D, and adds a ringing tone service tag to the MESSAGE message, so that the IPTV service terminal can know that the URL is used to play the ringing tone. After reaching the gateway, the MESSAGE message is converted into a notification message and sent to television set D.

Herein television set D is not shown separately in the figure, and is one type of service terminals in the figure.

609: After receiving the URL of the ringing tone, television set D may send an RTSP PAUSE or RTSP RECORD message to a play function entity so as to pause a current program or record the current program.

610: Television set D sends an HTTP session setup request message to request to set up a ringing tone session, where the HTTP request carries the URL of the ringing tone, and in addition, may carry an IPTV service terminal type, namely, a TV type; and the request message is converted into a SIP request message through the gateway, and sent through the ASM to the P2P Enabler.

611: The P2P Enabler adds an RTSP Session-ID of the ringing tone media stream currently delivered by the play function entity for user terminal D to a SIP INVITE message, and then forwards the INVITE message to the play function entity.

612: The play function entity finds, according to the session identity in the INVITE message, the multimedia ringing tone delivered for user terminal B, and obtains a currently played time offset, and in this case, may stop playing for user terminal B.

613: The play function entity returns a 200 OK response message, where the response message carries a time offset and finally reaches television set D.

614: Television set D sends an RTSP PLAY message to the play function entity, where the message carries the time offset and requests to start delivering the ringing tone.

615: The play function entity delivers the multimedia ringing tone for television set D. The play function entity may select a format suitable for the TV playing content according to the TV type, for example, ring back tone content in a high definition format, and send the selected ringing tone content to television set D.

616: Called user B goes off-hook; user terminal B sends a 200 OK off-hook message to user terminal A, where the message passes through the P2P Enabler and ASM, and reaches user terminal A; and when receiving the 200 OK off-hook message, the P2P Enabler sends an off-hook message to television set D through a MESSAGE message, where the off-hook message is converted into a notification message through the gateway and then sent to television set D.

617: After receiving the off-hook message, television set D may continue playing or stop playing the ringing tone.

618: When the call ends, either user goes on-hook, and the user terminal of the user sends a call end message; and when the P2P Enabler receives the call end message, the P2P Enabler sends the call end message to television set D through a MESSAGE message, where the message is converted into a notification message through the gateway and sent to television set D.

619: When receiving the call end message, television set D needs to stop playing the ringing tone, and needs to tear down an RTSP session with the play function entity at the same time, that is, television set D sends an announcement message carrying a bye message, the gateway converts the message into a bye message, and the P2P Enabler forwards the SIP BYE message to the play function entity. The play function entity stops sending the ringing tone, and releases corresponding resources.

In this embodiment, the preceding steps 602 to 607 may be omitted, so that the play capability entity directly sends the ringing tone media streams to the IPTV service terminal corresponding to the user without requiring the user to participate.

Device Embodiment 1

Figure 12:
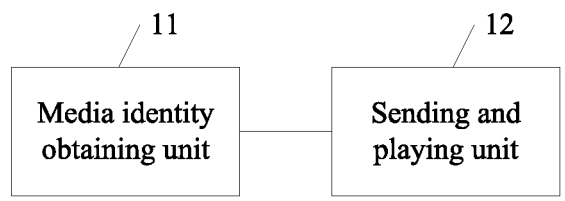
FIG. 12 is a schematic logical structural diagram of a person-to-person communication enabler device according to a first device embodiment of the present invention.

A person-to-person communication enabler device, of which a schematic structural diagram is shown in FIG. 12, includes a media identity obtaining unit 11, configured to obtain identity information of media streams of a ring tone service corresponding to a first user terminal and/or a second user terminal when the first user terminal calls the second user terminal, where the media streams of the ring tone service are a ring back tone media stream, or a ringing tone media stream, or a background tone media stream, and a sending and playing unit 12, configured to send the identity information of the media streams of the ring tone service obtained by the media identity obtaining unit 11 to an Internet Protocol Television service terminal corresponding to a first user and/or a second user, so that the Internet Protocol Television service terminal corresponding to the first user and/or the second user obtains and plays corresponding media streams of the ring tone service according to the identity information of the media streams of the ring tone service.

When the first user terminal calls the second user terminal, the first user terminal sends an INVITE message; after the P2P Enabler receives the INVITE message, the sending and playing unit 12 may first match user identity information of the first user and/or second user in the INVITE message with a mapping relationship between locally stored user identity information and IPTV service terminals, and extract identity information of a matched IPTV service terminal, so as to obtain an identity of the IPTV service terminal. The user identity information is information for uniquely identifying a user, while the service terminal identity information is information for uniquely identifying an IPTV service terminal.

It should be noted that if the information obtained by the media identity obtaining unit 11 is identity information of a ring back tone media stream, the sending and playing unit 12 sends the identity information of the ring back tone media stream to the IPTV service terminal corresponding to the first user, namely, a calling party; if the information is identity information of a ringing tone media stream, the sending and playing unit 12 sends the identity information of the ringing tone media stream to the IPTV service terminal corresponding to the second user, namely, a called party; and if the information is identity information of a background tone media stream, the sending and playing unit 12 sends the identity information of the background tone media stream to the IPTV service terminal corresponding to the first and second users, namely, the calling and called parties.

In the device of the embodiment of the present invention: When the first user terminal calls the second user terminal, the media identity obtaining unit 11 obtains the identity information of the media streams of the ring tone service corresponding to the first user terminal and/or the second user terminal; accordingly, the sending and playing unit 12 sends the identity information of the media streams of the ring tone service obtained by the media identity obtaining unit 11 to the Internet Protocol Television service terminal corresponding to the first user and/or the second user, so that the Internet Protocol Television service terminal corresponding to the first user and/or the second user obtains and plays the corresponding media streams of the ring tone service according to the identity information of the media streams of the ring tone service. In this way, during a call based on the IPTV system, the media streams of the ring back tone service associated with the calling party and the called party can be played on the IPTV service terminal, which enriches the content of the call and meets the diversified requirements of users.

Figure 13:
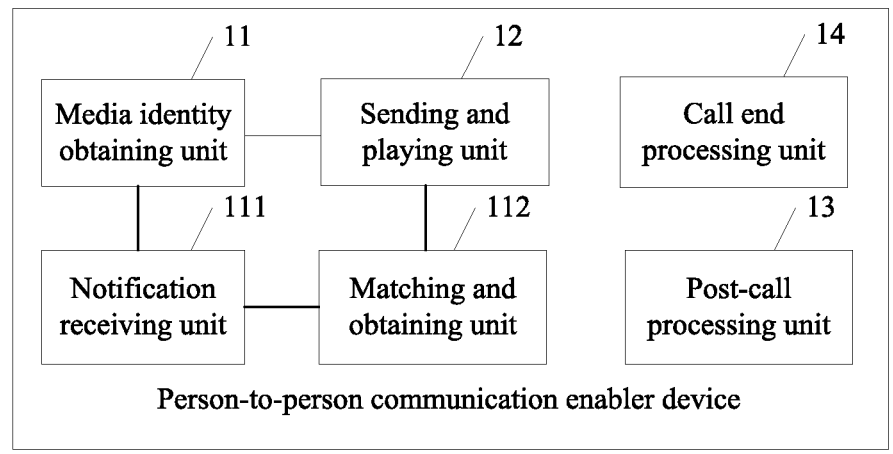
FIG. 13 is a schematic logical structural diagram of another person-to-person communication enabler device according to a device embodiment of the present invention.

Referring to FIG. 13, in a specific embodiment, the person-to-person communication enabler device may further include a notification receiving unit 111, configured to receive a notification message sent by a current originating network, where the notification message includes the user identity information of the first user and/or the second user, and the identity information of the media streams of the ring tone service, a matching and obtaining unit 112, configured to match the user identity information of the first user and/or second user in the notification message received by the notification receiving unit 111 with the mapping relationship between user identity information and IPTV service terminals, and extract the identity information of the IPTV service terminal matching the user identity information of the first user and/or second user and corresponding to the user identity information, a media identity obtaining unit 11, specifically configured to parse the notification message received by the notification receiving unit 111 to obtain the identity information of the media streams of the ring tone service, and a sending and playing unit 12, specifically configured to send, according to the identity information of the IPTV service terminal obtained by the matching and obtaining unit 112, the identity information of the media streams of the ring tone service obtained by the media identity obtaining unit 11.

When the IPTV system does not support call services, the P2P Enabler needs to receive, through the notification receiving unit 111, the notification message sent by the current originating network; in this case, the media identity obtaining unit 11 obtains the identity information of the media streams of the ring tone service by parsing the notification message.

In addition, the device in this embodiment further includes a post-call processing unit 13, configured to: after the first user terminal and the second user terminal start the call, send an off-hook message to the Internet Protocol Television service terminal corresponding to the first user and/or second user, so that the Internet Protocol Television service terminal corresponding to the first user and/or second user continues playing or pauses playing the media streams of the ring tone service, or decreases the audio volume in the media streams of the ring tone service or stops playing, and a call end processing unit 14, configured to: when the first user terminal and the second user terminal end the call, send a call end message to the Internet Protocol Television service terminal corresponding to the first user and/or second user, so that the Internet Protocol Television service terminal corresponding to the first user and/or second user stops playing the media streams of the ring tone service.

Figure 14:
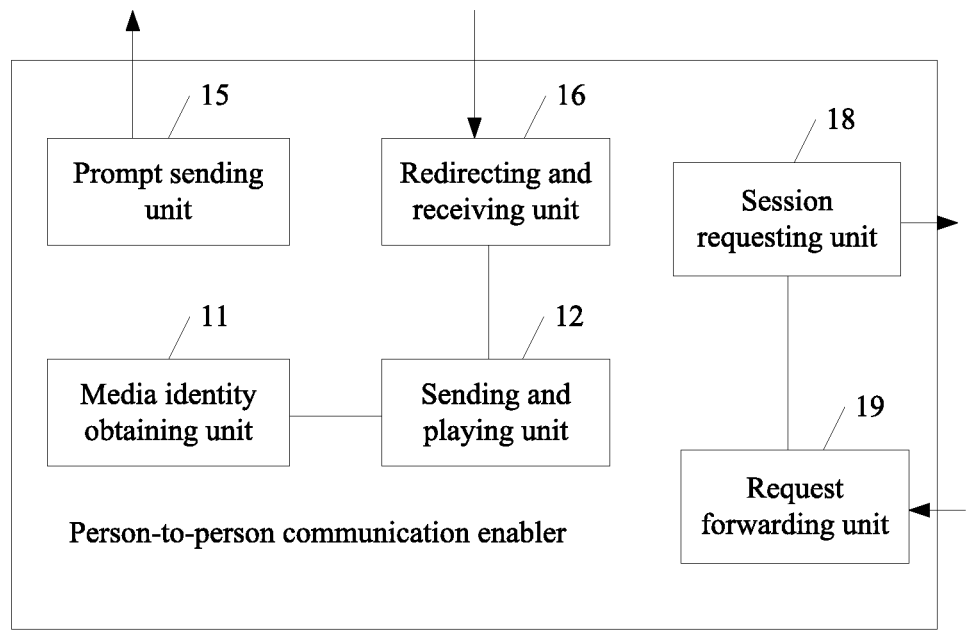
FIG. 14 is a schematic logical structural diagram of still another person-to-person communication enabler device according to a device embodiment of the present invention.

Referring to FIG. 14, in other specific embodiments, the person-to-person communication enabler device may further include a prompt sending unit 15, configured to send prompt information to the Internet Protocol Television service terminal corresponding to the first user and/or second user or to the first and/or second user terminal, where the prompt information is used to prompt a user to select an Internet Protocol Television service terminal corresponding to the user as a redirecting terminal for the media streams of the ring tone service, or to select one from multiple Internet Protocol Television service terminals corresponding to the user as the redirecting terminal for the media streams of the ring tone service, and a redirecting and receiving unit 16, configured to receive information about the selected redirecting terminal for the media streams of the ring tone service; where the sending and playing unit 12 is specifically configured to send the obtained identity information of the media streams of the ring tone service to the selected redirecting terminal for the media streams of the ring tone service after the redirecting and receiving unit 16 receives the information about the redirecting terminal, because there may be multiple IPTV service terminals corresponding to a user, for example, a television set, a personal computer, and a digital photo frame, to play the media streams on only the service terminal required by the user, the prompt sending unit 15 may send the prompt information to prompt the user to select one or more IPTV service terminals, and in this way, the user selects, through the service terminal or user terminal, the service terminal for playing the media streams, namely, the redirecting terminal for the media streams of the ring tone service, and sends the information about the redirecting terminal, such as a type identity, to the P2P Enabler; and after receiving the information about the redirecting terminal, the redirecting and receiving unit 16 directly sends the identity information of the media streams of the ring tone service to the redirecting terminal, a session requesting unit 18, configured to receive a session setup request message sent by the selected redirecting terminal for the media streams of the ring tone service, where the session setup request message is used to request to set up a session connection of the media streams of the ring tone service, and a request forwarding unit 19, configured to forward the session setup request message received by the session requesting unit 18 to the play function entity, where the forwarded session setup request message carries a session identity of the media streams of the ring tone service currently delivered for the first user terminal and/or second user terminal so that the play function entity delivers the media streams of the ring tone service to the Internet Protocol Television service terminal corresponding to the first user and/or second user according to the session identity.

After receiving the identity information of the media streams of the ring tone service, the redirecting terminal sends a session setup request message to request to set up a session of the media streams of the ring tone service; after the session requesting unit 18 receives the session setup request message, the request forwarding unit 19 forwards the session setup request message to the play function entity, and adds the session identity of the media streams of the ring tone service currently sent by the play function entity for the user terminal into the message; in this way, the play function entity obtains a time offset from the start time of delivery for the user terminal to the current time according to the session identity, and delivers content of the media streams of the ring tone service corresponding to the time offset to the IPTV service terminal, without restarting the playing.

The preceding units in the person-to-person communication enabler device from FIG. 11 to FIG. 13 may perform the method for playing information based on Internet Protocol Television as described in the first method embodiment, which is not further described herein.

Device Embodiment 2

Figure 15:
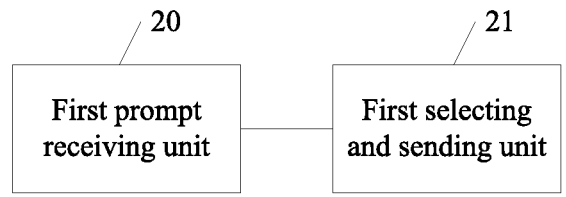
FIG. 15 is a schematic logical structural diagram of a user terminal according to a second device embodiment of the present invention.

A user terminal, of which a schematic structural diagram is shown in FIG. 15, includes a first prompt receiving unit 20, configured to receive a prompt message, where the prompt message is used to prompt a user to select an Internet Protocol Television service terminal for playing media streams of a ring tone service, and a first selecting and sending unit 21, configured to: after the first prompt receiving unit 20 receives the prompt message, receive information about a redirecting terminal selected by the user for the media streams of the ring tone service among corresponding Internet Protocol Television service terminals, and send the information about the redirecting terminal selected by the user to a person-to-person communication enabler, so that the person-to-person communication enabler sends identity information of corresponding media streams of the ring tone service to the selected redirecting terminal for playing the media streams of the ring tone service.

Evidently, in the user terminal of the embodiment of the present invention: the first prompt receiving unit 20 receives a prompt message, where the prompt message is used to prompt a user to select an Internet Protocol Television service terminal for playing media streams of a ring tone service; the first selecting and sending unit 21 selects a redirecting terminal for the media streams of the ring tone service among Internet Protocol Television service terminals corresponding to the user, and sends information about the selected redirecting terminal to a person-to-person communication enabler, so that the person-to-person communication enabler sends identity information of corresponding media streams of the ring tone service to the selected redirecting terminal for playing the media streams of the ring tone service. With the method of this embodiment, the media streams of the ring tone service usually played on the user terminal may be redirected to the IPTV service terminal corresponding to the user, which meets the diversified requirements of users for playing media streams of the ring tone service.

Device Embodiment 3

Figure 16:
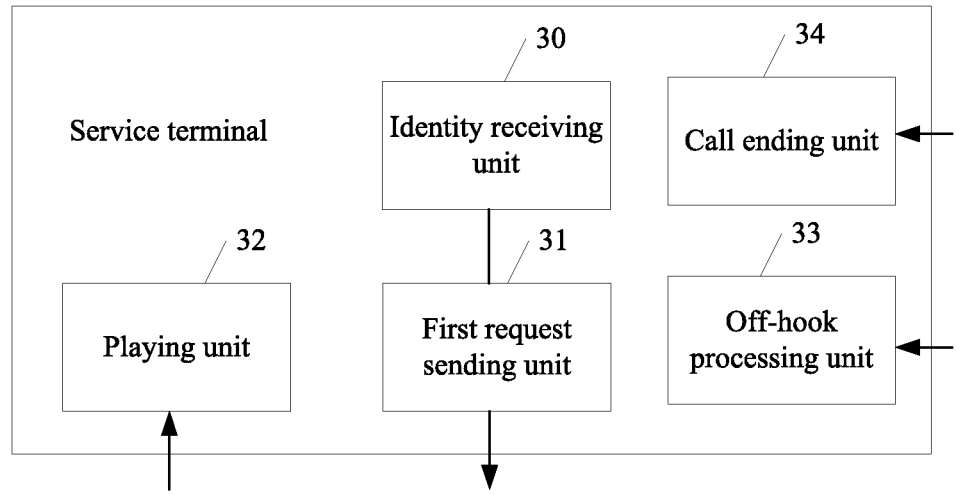
FIG. 16 is a schematic logical structural diagram of a service terminal according to a device embodiment of the present invention.

A service terminal, of which a schematic structural diagram is shown in FIG. 16, includes an identity receiving unit 30, configured to receive identity information of media streams of a ring tone service sent by a person-to-person communication enabler, a first request sending unit 31, configured to: when the identity receiving unit 30 receives the identity information of the media streams of the ring tone service, send a request message to a play function entity to request the play function entity to deliver corresponding media streams of the ring tone service, where the media streams of the ring tone service are media streams of the ring tone service corresponding to a first user terminal and/or a second user terminal when the first user terminal calls the second user terminal, a playing unit 32, configured to receive and play the delivered media streams of the ring tone service, where it is understandable that when the identity receiving unit 30 receives the identity information of the media streams of the ring tone service, the first request sending unit 31 sends a play request message; and the play function entity delivers the corresponding media streams of the ring tone service to the terminal, and the first playing unit 32 plays the media streams after receiving the media streams, an off-hook processing unit 33, configured to continue playing or pause playing the media streams of the ring tone service after receiving an off-hook message sent by the person-to-person communication enabler, or decrease the audio volume in the media streams of the ring tone service or stop playing, and a call ending unit 34, configured to stop playing the media streams of the ring tone service after receiving a call end message sent by the person-to-person communication enabler.

The called user terminal sends an off-hook message after going off-hook, where the off-hook message reaches the terminal through the person-to-person communication enabler and is processed by the off-hook processing unit 33 accordingly; when either one of the calling and called user terminals goes on-hook, a call end message is sent, where the call end message reaches the terminal through the person-to-person communication enabler and is processed by the call ending unit 34 accordingly.

Figure 17:
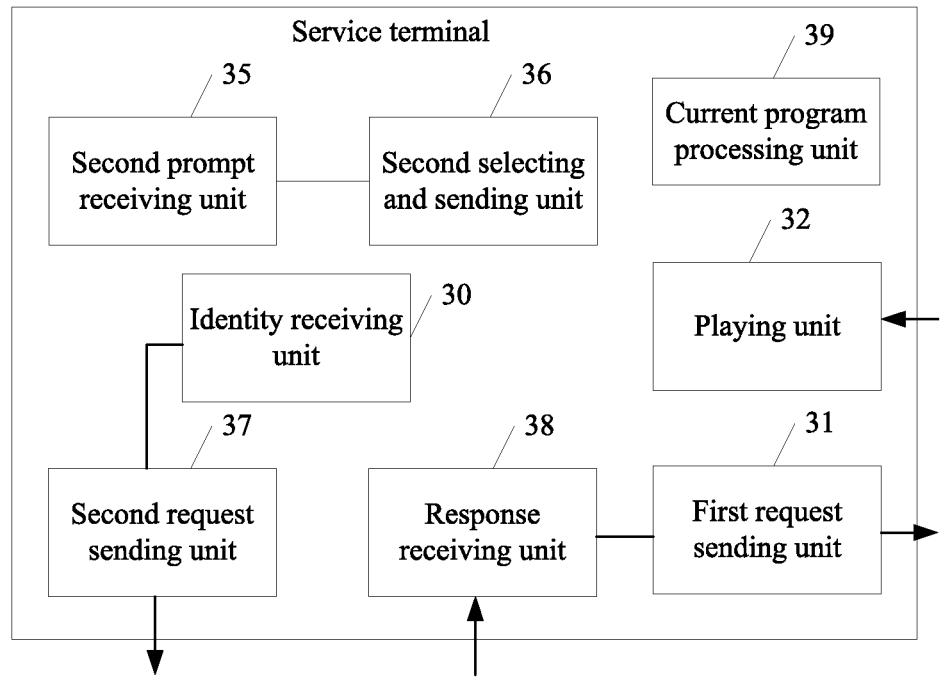
FIG. 17 is a schematic logical structural diagram of another service terminal according to a device embodiment of the present invention.

Referring to FIG. 17, in other specific embodiments, the service terminal may further include: a second prompt receiving unit 35, a second selecting and sending unit 36, a second request sending unit 37, a response receiving unit 38, and a current program processing unit 39.

The second prompt receiving unit 35 is configured to receive a prompt message, where the prompt message is used to prompt a user to select an Internet Protocol Television service terminal for playing media streams of a ring tone service.

The second selecting and sending unit 36 is configured to: after the second prompt receiving unit 35 receives the prompt message, receive information about a redirecting terminal selected by the user for the media streams of the ring tone service among corresponding Internet Protocol Television service terminals, and send the information about the redirecting terminal selected by the user to a person-to-person communication enabler, so that the person-to-person communication enabler sends identity information of corresponding media streams of the ring tone service to the selected redirecting terminal for playing the media streams of the ring tone service.

The second request sending unit 37 is configured to: after the identity receiving unit 30 receives the identity information of the media streams of the ring tone service sent by the person-to-person communication enabler, send a session setup request message to request to set up a session connection of the media streams of the ring tone service.

The response receiving unit 38 is configured to receive a response message sent by the play function entity, where the response message carries a time offset of the media streams of the ring tone service currently delivered for the user terminal.

The first request sending unit 31 is specifically configured to send a play request message to the play function entity to request the play function entity to send, according to the time offset in the response message received by the response receiving unit 38, the media streams of the ring tone service currently delivered for the user terminal.

The current program processing unit 39 is configured to: after the identity receiving unit 30 receives the identity information of the media streams of the ring tone service, send a pause message to the play function entity to request the play function entity to pause delivering a current program; or send a record message to request the play function entity to record the current program.

It is understandable that in this embodiment, the second prompt receiving unit 35 in the service terminal receives the prompt message, and the user selects a redirecting terminal; and when receiving the selection of the user, the second selecting and sending unit 36 sends the information about the redirecting terminal to the person-to-person communication enabler. If the user selects the service terminal that receives the prompt message, the identity receiving unit 30 receives the identity information of the media streams of the ring tone service, and the second request sending unit 37 may send a session setup request message to the person-to-person communication enabler, while the person-to-person communication enabler finds the session identity of the media streams of the ring tone service currently sent by the play function entity for the user terminal, and sends the session identity to the play function entity; the play function entity finds, according to the session identity, the time offset and sends the time offset to the terminal; when the response receiving unit 38 receives the response message carrying the time offset, the first request sending unit 31 sends a play request message to the play function entity; the playing unit 32 plays the media streams of the ring tone service sent by the play function entity after receiving the media streams.

The preceding units in the user terminal in FIG. 15 to FIG. 17 may perform the method for displaying media streams according to the second method embodiment, which is not further described herein.

An embodiment of the present invention further provides a system for displaying information based on Internet Protocol Television. The system includes the person-to-person communication enabler shown in any one of the embodiments in FIG. 12 to FIG. 14, and the terminal shown in any one of the embodiments in FIG. 15 to FIG. 17. In addition, the implementation method and interaction process of each device in the system of the embodiment may refer to the related description in the method embodiments.

Evidently, the embodiments of the present invention disclose a method, system and device for displaying information based on Internet Protocol Television, and the method mainly includes: during a call service based on an IPTV system, when a first user terminal calls a second user terminal, obtaining, by a person-to-person communication enabler in the IPTV system, identity information of media streams of a ring tone service corresponding to the first and/or second user, and sending the obtained identity information of the media streams of the ring tone service to an Internet Protocol Television service terminal corresponding to the first and/or second user, for playing corresponding media streams of the ring tone service.

The method in the embodiments of the present invention may implement the following functions:

1. The IPTV system plays media streams of the ring tone service.

2. The user may transfer the media streams of the ring tone service played on the user terminal to any bound IPTV service terminal, for example, a television set, a personal computer, and a digital photo frame.

3. When the media streams of the ring tone service are transferred from the user terminal to the IPTV service terminal, the continuity of played media streams may be maintained.

4. When a call state such as call incoming, call start, or call end is sensed, playing of the media streams of the ring tone service may be controlled synchronously.

In this way, during a call based on the IPTV system, the media streams of the ring back tone service associated with a calling party and a called party can be played on the IPTV service terminal, which enriches the content of the call and meets the diversified requirements of users.

Persons of ordinary skill in the art may understand that all or a part of the steps of the methods according to the preceding embodiments may be implemented by a program instructing relevant hardware. The program may be stored in a computer readable storage medium. The storage medium may include a read only memory (ROM), a random access memory (RAM), a magnetic disk, or an optical disk, and so on.

Detailed above are a method and device for displaying information according to the embodiments of the present invention. Although the principle and implementation of the present invention are described with reference to exemplary embodiments, the embodiments are only intended to help understand the method and core idea of the present invention. In addition, with respect to the implementation and application scope of the present invention, modifications and variations may be made by persons of ordinary skill in the art according to the idea of the present invention. Therefore, the specification shall not be construed as a limitation to the present invention.

What is claimed is:

1. A method for displaying information based on Internet Protocol Television, the method comprising:
    obtaining identity information of media streams of a ring tone service corresponding to a first user terminal and/or a second user terminal when the first user terminal calls the second user terminal, wherein the media streams comprise a ring back tone media stream, a ringing tone media stream, and a background tone media stream; and
    sending the identity information to an Internet Protocol Television service terminal corresponding to a first user and/or a second user, so that the Internet Protocol Television service terminal corresponding to the first user and/or the second user can obtain and play corresponding media streams of the ring tone service according to the identity information of the media streams of the ring tone service.

2. The method according to claim 1, wherein
    before obtaining the identity information, the method further comprises receiving a notification message sent by a current originating network, wherein the notification message comprises user identity information of the first user and/or the second user and the identity information of the media streams of the ring tone service;
    obtaining identity information of the media streams of the ring tone service specifically comprises parsing the notification message to obtain the identity information of the media streams of the ring tone service; and before sending the identity information, the method further comprises matching the user identity information of the first user and/or second user with a mapping relationship between user identity information and IPTV service terminals and extracting identity information of an IPTV service terminal matching the user identity information of the first user and/or second user and corresponding to the user identity information.

3. The method according to claim 1, wherein, before sending the identity information of the media streams of the ring tone service, the method further comprises:
sending prompt information to the Internet Protocol Television service terminal corresponding to the first user and/or second user or to the first and/or second user terminal, wherein the prompt information is used to prompt a user to select an Internet Protocol Television service terminal corresponding to the user as a redirecting terminal for the media streams of the ring tone service, or to select one from multiple Internet Protocol Television service terminals corresponding to the user as the redirecting terminal for the media streams of the ring tone service; and
receiving information about the selected redirecting terminal for the media streams of the ring tone service and sending the obtained identity information of the media streams of the ring tone service to the selected redirecting terminal for the media streams of the ring tone service.

4. The method according to claim 3, further comprising:
receiving a session setup request message sent by the selected redirecting terminal for the media streams of the ring tone service, wherein the session setup request message is used to request to set up a session of the media streams of the ring tone service; and
forwarding the session setup request message to a play function entity, wherein the forwarded session setup request message carries a session identity of the media streams of the ring tone service currently delivered by the play function entity for the first user terminal and/or the second user terminal, so that the play function entity delivers the media streams of the ring tone service to the Internet Protocol Television service terminal corresponding to the first user and/or the second user according to session identity.

5. The method according to claim 4, wherein the session setup request message further comprises a type identity of the redirecting terminal to request the play function entity to deliver streaming media of the ring tone service suitable for a playing format of the redirecting terminal corresponding to the type identity to the redirecting terminal.

6. The method according to claim 1, further comprising:
after the first user terminal and the second user terminal start a call, sending an off-hook message to the Internet Protocol Television service terminal corresponding to the first user and/or second user, so that the Internet Protocol Television service terminal corresponding to the first user and/or second user continues playing or pauses playing the media streams of the ring tone service, or decreases audio volume in the media streams of the ring tone service or stops playing.

7. A method for displaying information, comprising:
sending a request message to a play function entity to request the play function entity to deliver corresponding media streams of the ring tone service after receiving identity information of media streams of a ring tone service sent by a person-to-person communication enabler, wherein the media streams of the ring tone service are media streams of the ring tone service corresponding to a first user terminal and/or a second user terminal when the first user terminal calls the second user terminal, and wherein the media streams comprise a ring back tone media stream, a ringing tone media stream, and a background tone media stream; and
receiving and playing the media streams of the ring tone service delivered by the play function entity.

8. The method according to claim 7, wherein, before receiving the receiving identity information, the method further comprises:
receiving a prompt message, wherein the prompt message is used to prompt a user to select an Internet Protocol Television service terminal for playing the media streams of the ring tone service;
receiving information about a redirecting terminal selected by the user for the media streams of the ring tone service among corresponding Internet Protocol Television service terminals; and
sending the information about the redirecting terminal selected by the user to the person-to-person communication enabler, so that the person-to-person communication enabler sends identity information of the corresponding media streams of the ring tone service to the selected redirecting terminal for playing the media streams of the ring tone service.

9. The method according to claim 7, wherein after receiving the identity information of the media streams, the method further comprises:
sending a session setup request message to request to set up a session of the media streams of the ring tone service; and
receiving a response message sent by the play function entity, wherein the response message carries a time offset of the media streams of the ring tone service currently delivered for the user terminal;
wherein sending the request message to the play function entity specifically comprises sending a play request message to the play function entity to request the play function entity to continue sending, according to the time offset, the media streams of the ring tone service current delivered for the user terminal.

10. The method according to claim 9, wherein the session setup request message comprises a type identity of the service terminal, to request the play function entity to deliver streaming media of the ring tone service suitable for a playing format of a redirecting terminal corresponding to the type identity to the service terminal.

11. A person-to-person communication enabler device, comprising:
a media identity obtaining unit, configured to obtain identity information of media streams of a ring tone service corresponding to a first user terminal and/or a second user terminal when the first user terminal calls the second user terminal, wherein the media streams comprise a ring back tone media stream, a ringing tone media stream, and a background tone media stream; and
a sending and playing unit, configured to send the identity information of the media streams of the ring tone service obtained by the media identity obtaining unit to an Internet Protocol Television service terminal corresponding to a first user and/or a second user, so that the Internet Protocol Television service terminal corresponding to the first user and/or the second user obtains and plays corresponding media streams of the ring tone service according to the identity information of the media streams of the ring tone service.

12. The device according to claim 11, further comprising:
a notification receiving unit, configured to receive a notification message sent by a current originating network, wherein the notification message comprises user identity information of the first user and/or the second user and the identity information of the media streams of the ring tone service; and
a matching and obtaining unit, configured to match the user identity information of the first user and/or the second user in the notification message received by the notification receiving unit with a mapping relationship between user identity information and IPTV service terminals and to extract identity information of an IPTV service terminal matching the user identity information of the first user and/or second user and corresponding to the user identity information;
wherein the media identity obtaining unit is specifically configured to parse the notification message received by the notification receiving unit to obtain the identity information of the media streams of the ring tone service; and
wherein the sending and playing unit is specifically configured to send, according to the identity information of the IPTV service terminal obtained by the matching and obtaining unit, the identity information of the media streams of the ring tone service obtained by the media identity obtaining unit.

13. The device according to claim 11, further comprising:
a prompt sending unit, configured to send prompt information to the Internet Protocol Television service terminal corresponding to the first user and/or second user or to the first and/or second user terminal, wherein the prompt information is used to prompt a user to select an Internet Protocol Television service terminal corresponding to the user as a redirecting terminal for the media streams of the ring tone service, or to select one from multiple Internet Protocol Television service terminals corresponding to the user as the redirecting terminal for the media streams of the ring tone service; and
a redirecting and receiving unit, configured to receive information about the selected redirecting terminal for the media streams of the ring tone service;
wherein the sending and playing unit is specifically configured to send the obtained identity information of the media streams of the ring tone service to the selected redirecting terminal for the media streams of the ring tone service after the redirecting and receiving unit receives the information about the redirecting terminal.

14. The device according to claim 13, further comprising:
a session requesting unit, configured to receive a session setup request message sent by the selected redirecting terminal for the media streams of the ring tone service, wherein the session setup request message is used to request to set up a session of the media streams of the ring tone service; and
a request forwarding unit, configured to forward the session setup request message received by the session requesting unit to a play function entity, wherein the forwarded session setup request message carries a session identity of the media streams of the ring tone service currently delivered for the first user terminal and/or second user terminal so that the play function entity delivers the media streams of the ring tone service to the Internet Protocol Television service terminal corresponding to the first user and/or second user according to the session identity.

15. The device according to claim 11, further comprising:
a post-call processing unit, configured to, after the first user terminal and the second user terminal start the call, send an off-hook message to the Internet Protocol Television service terminal corresponding to the first user and/or second user, so that the Internet Protocol Television service terminal corresponding to the first user and/or second user continues playing or pauses playing the media streams of the ring tone service, or decreases audio volume in the media streams of the ring tone service or stops playing.

16. A service terminal, comprising:
an identity receiving unit, configured to receive identity information of media streams of a ring tone service sent by a person-to-person communication enabler, wherein the media streams comprise a ring back tone media stream, a ringing tone media stream, and a background tone media stream;
a first request sending unit, configured to, when the identity receiving unit receives the identity information of the media streams of the ring tone service, send a request message to a play function entity to request the play function entity to deliver corresponding media streams of the ring tone service, wherein the media streams of the ring tone service are media streams of the ring tone service corresponding to a first user terminal and/or a second user terminal when the first user terminal calls the second user terminal; and
a playing unit, configured to receive and play the media streams of the ring tone service delivered by the play function entity.

17. The terminal according to claim 16, further comprising:
a second prompt receiving unit, configured to receive a prompt message, wherein the prompt message is used to prompt a user to select an Internet Protocol Television service terminal for playing the media streams of the ring tone service; and
a second selecting and sending unit, configured to, after the second prompt receiving unit receives the prompt message, receive information about a redirecting terminal selected by the user for the media streams of the ring tone service among corresponding Internet Protocol Television service terminals, and to send the information about the redirecting terminal selected by the user to the person-to-person communication enabler, so that the person-to-person communication enabler sends the identity information of the corresponding media streams of the ring tone service to the selected redirecting terminal for playing the media streams of the ring tone service.

18. The terminal according to claim 16, further comprising:
a second request sending unit, configured to, after the identity receiving unit receives the identity information of the media streams of the ring tone service returned by the person-to-person communication enabler, send a session setup request message to request to set up a session connection of the media streams of the ring tone service; and
a response receiving unit, configured to receive a response message sent by the play function entity, wherein the response message carries a time offset of the media streams of the ring tone service currently delivered for the user terminal;
wherein the first request sending unit is specifically configured to send a play request message to the play function entity to request the play function entity to send, according to the time offset in the response message received by the response receiving unit, the media streams of the ring tone service currently delivered for the user terminal.

19. The terminal according to claim 18, further comprising a current program processing unit, configured to, after the identity receiving unit receives the identity information of the media streams of the ring tone service, send a pause message to the play function entity to request the play function entity to pause delivering a current program or send a record message to request the play function entity to record the current program.

20. The terminal according to claim 16, further comprising an off-hook processing unit, configured to continue playing or pause playing the media streams of the ring tone service after receiving an off-hook message sent by the person-to-person communication enabler, or decrease audio volume in the media streams of the ring tone service or stop playing.

21. The terminal according to claim 16, further comprising a call ending unit, configured to stop playing the media streams of the ring tone service after receiving a call end message sent by the person-to-person communication enabler.

* * * * *